(12) United States Patent
Seidel et al.

(10) Patent No.: US 10,049,704 B2
(45) Date of Patent: *Aug. 14, 2018

(54) METHODS AND SYSTEMS OF DYNAMICALLY MANAGING CONTENT FOR USE BY A MEDIA PLAYBACK DEVICE

(71) Applicant: Deluxe Media Inc., Burbank, CA (US)

(72) Inventors: Robert Seidel, Valencia, CA (US); Allan Lamkin, San Diego, CA (US)

(73) Assignee: Deluxe Media Inc., Burbank, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 14/315,668

(22) Filed: Jun. 26, 2014

(65) Prior Publication Data

US 2014/0308022 A1    Oct. 16, 2014

Related U.S. Application Data

(63) Continuation of application No. 13/301,314, filed on Nov. 21, 2011, now Pat. No. 8,799,395.

(Continued)

(51) Int. Cl.
*G11B 27/36* (2006.01)
*H04N 5/76* (2006.01)
(Continued)

(52) U.S. Cl.
CPC ............... *G11B 27/36* (2013.01); *H04N 5/76* (2013.01); *H04N 21/41407* (2013.01);
(Continued)

(58) Field of Classification Search
None
See application file for complete search history.

(56) References Cited

U.S. PATENT DOCUMENTS

2001/0037367 A1    11/2001  Iyer
2002/0049826 A1*   4/2002   Ariga ............... H04L 51/38
                                                         709/216

(Continued)

OTHER PUBLICATIONS

USPTO; Requirement for Restriction/Election for U.S. Appl. No. 13/301,314; dated Aug. 28, 2013; 7 pgs.

(Continued)

*Primary Examiner* — Thomas J Dailey
(74) *Attorney, Agent, or Firm* — Dorsey & Whitney LLP

(57) ABSTRACT

Some embodiments provide systems and/or methods of managing content in providing a playback experience associated with a portable storage medium by detecting access to a first portable storage medium with multimedia content recorded on the first portable storage medium; evaluating content on the first portable storage medium; evaluating local memory of the multimedia playback device; determining, in response to the evaluation of the content on the first portable storage medium and the evaluation of the local memory, whether memory on the local memory needs to be freed up in implementing playback of multimedia content in association with the first portable storage medium; and moving one or more contents stored on the local memory of the multimedia playback device to a virtual storage accessible by the multimedia playback device over a distributed network in response to determining that memory on the local memory needs to be freed up.

22 Claims, 15 Drawing Sheets

Related U.S. Application Data

(60) Provisional application No. 61/415,933, filed on Nov. 22, 2010.

(51) Int. Cl.
| | | |
|---|---|---|
| *H04N 21/4335* | (2011.01) | |
| *H04N 21/414* | (2011.01) | |
| *H04N 5/765* | (2006.01) | |
| *H04N 5/781* | (2006.01) | |
| *H04N 5/85* | (2006.01) | |
| *H04N 5/907* | (2006.01) | |
| *H04N 9/82* | (2006.01) | |

(52) U.S. Cl.
CPC ......... *H04N 21/4335* (2013.01); *H04N 5/765* (2013.01); *H04N 5/781* (2013.01); *H04N 5/85* (2013.01); *H04N 5/907* (2013.01); *H04N 9/8205* (2013.01)

(56) References Cited

U.S. PATENT DOCUMENTS

| | | |
|---|---|---|
| 2005/0192975 A1 | 9/2005 | Reiner |
| 2006/0159109 A1 | 7/2006 | Lamkin |
| 2006/0221190 A1 | 10/2006 | Limberis |
| 2008/0240687 A1 | 10/2008 | Kim |
| 2008/0313402 A1 | 12/2008 | Wong |
| 2010/0114853 A1 | 5/2010 | Fisher |
| 2010/0287071 A1 | 11/2010 | Shah |
| 2012/0124172 A1 | 5/2012 | Sparks |

OTHER PUBLICATIONS

USPTO; Non-final office action for U.S. Appl. No. 13/301,314; dated Dec. 24, 2013; 9 pgs.

USPTO; Notice of Allowance for U.S. Appl. No. 13/301,314; dated Apr. 11, 2014; 8 pgs.

EPO; Extended European Search Report for European Patent Application No. 11189951.4; dated Jun. 18, 2014; 5 pgs.

\* cited by examiner

METHODS AND SYSTEMS OF DYNAMICALLY MANAGING CONTENT FOR USE BY A MEDIA PLAYBACK DEVICE

This application is a continuation of U.S. patent application Ser. No. 13/301,314 filed 21 Nov. 2011, now U.S. Pat. No. 8,799,395. This application claims the benefit of U.S. Provisional Application No. 61/415,933 filed November 2010 entitled METHODS AND SYSTEMS OF DYNAMICALLY MANAGING CONTENT FOR USE BY A MEDIA PLAYBACK DEVICE, which is incorporated in its entirety herein by reference.

BACKGROUND

1. Field of the Invention

The present invention relates generally to playing back content, and more specifically to playing back content in association with a portable storage medium.

2. Discussion of the Related Art

Over the last several decades the distribution of content, such as multimedia content, images, video, music and other such content, has increased tremendously. There are a number of different formats for distributing content as well as a number of different mediums upon which content can be stored. Further, digital recordings of content have generally become the preferred mode of storing content according to some applications.

Next generation digital media formats, such as Blu-ray Disc and HD-DVD Disc, generally require that data is prepared and stored on a disc in such a manner to describe content that is stored on the disc. Typically, this information is stored in a read only manner that does not support the direct modification of such descriptive data. As such, content played back from the disc is immediately dated when it is recorded to the disc. Further, some data or content stored on the disc can rapidly become outdated or obsolete.

SUMMARY OF THE INVENTION

Several embodiments of the invention advantageously address the needs above as well as other needs by providing methods of managing content in providing a playback experience associated with a portable storage medium. Some of these embodiments provide a method of managing content in providing a playback experience associated with a portable storage medium, the method comprising: detecting, at a multimedia playback device, access to a first portable storage medium with multimedia content recorded on the first portable storage medium; evaluating content on the first portable storage medium, in response to detecting access to the first portable storage medium; evaluating local memory of the multimedia playback device; determining, in response to the evaluation of the content on the first portable storage medium and the evaluation of the local memory, whether memory on the local memory needs to be freed up in implementing playback of multimedia content in association with the first portable storage medium; and moving one or more contents stored on the local memory of the multimedia playback device to a virtual storage accessible by the multimedia playback device over a distributed network in response to determining that memory on the local memory needs to be freed up.

Additionally, some embodiments provide a method of managing content to be played back at a playback device in association with a portable processor readable storage medium, the method comprising: receiving a request, from a remote playback device and over a distributed network, to move a first content currently stored in local storage of the remote playback device; identifying the playback device from which the request is received; determining whether virtual storage is associated with the identified playback device; storing content to a virtual storage; and associating the stored content stored in the virtual storage with the identified playback device.

Further, some embodiments provide a method of managing content, the method comprising: receiving a request, from a remote playback device and over a distributed network, to retrieve a first content to be played back at the playback device in cooperation with a processor readable portable storage medium directly accessed by the playback device; identifying a virtual storage associated with the request; determining whether the first content is stored within the identified virtual storage; determining whether a second content is to be provided in place of the first content; and supplying the second content to the playback device in response to determining that second content is to be provided in place of the first content.

BRIEF DESCRIPTION OF THE DRAWINGS

The above and other aspects, features and advantages of several embodiments of the present invention will be more apparent from the following more particular description thereof, presented in conjunction with the following drawings.

Figure 1B:
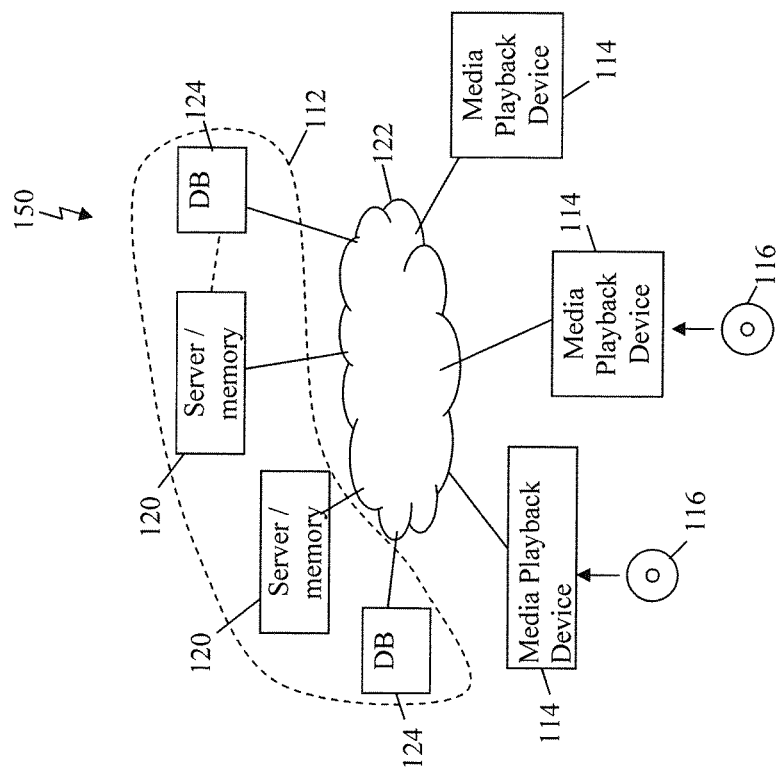
FIG. 1B depicts a simplified block diagram of a system according to some embodiments that provides for virtual storage, where the virtual storage is distributed over one or more storage devices, such as one or more servers and/or databases.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present embodiments enhance the playback of media through a playback device by, at least in part, augmenting and/or supplementing storage of content that can be accessed by the playback device. With many playback devices, such as Blu-ray Disc (BD) player and other digital media playback devices, the available local data storage is often limited. For example, the BD specification designates that a BD player includes 1 Gbyte of data storage. In some instance, additional or enhanced content can be played back through the playback device in cooperation with a portable storage medium. For example, additional content may be retrieved from a remote source and stored locally to be played back in cooperation with a portable storage medium when accessed by the playback device. Because of the data size associated with multimedia content, and particularly with high definition multimedia content, the relatively limited memory of a playback device may rapidly be filled. This can limit the capabilities of the playback device, detract from the speed of the playback device, limit what content may be played back, may introduce undesirable delays and have other adverse affects.

Some embodiments expand local memory on a playback device by establishing a virtual storage or memory that can be used in association with a portable storage medium being accessed by the playback device. The virtual storage can be utilized by the playback device to increase memory availability, to retain content and to enhance a playback experience in association with the portable storage medium. Again, playback devices often have limited local storage. As a result, the playback device can often fill the available local storage. Further, some playback devices and/or content that may be recorded in local memory on the playback device may limit or prevent the deletion of the content. In many instances, authorization is needed to delete content from the local memory, and further, with some playback devices, user action through a user interface may be needed to go in and manually delete content stored locally on the playback device. Additionally, data that is saved locally on a first playback device is typically unavailable on a second playback device (e.g., playback information, saved games, scores, states, content and other such content).

Alternatively, some present embodiments utilize the virtual storage, at least in part, to expand the local memory that augments the local memory of the playback device with remote storage. The utilization of this virtual storage is seamless to a user, and typically controlled by applications on the portable storage medium. In part, the virtual storage in cooperation with the local memory of the playback device can store additional content to be utilized in cooperation with one or more portable storage mediums, and in some instances enhance a playback experience by supplementing and/or overriding content on the portable storage medium. The additional content that can be maintained on the virtual storage can include substantially any relevant content and/or information that is to be utilized in a playback experience associated with a portable storage medium being accessed by a playback device. For example, the additional content can include, but is not limited to, multimedia content to be played back by the playback device, updates, playlists, index tables, scores in games implemented on the playback device, status information regarding a game or playback of content, content, content previously acquired from the virtual storage, content acquired from another remote source, and other such content and/or combinations of such content.

Figure 1A:
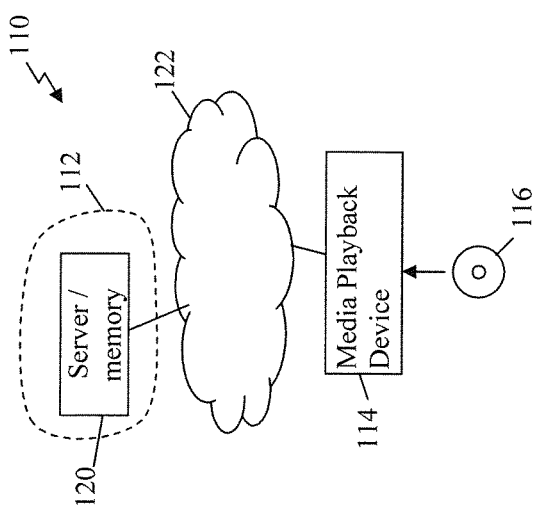
FIG. 1A depicts a simplified block diagram of a system according to some embodiments that provides for virtual storage.

FIG. 1A depicts a simplified block diagram of a system 110 according to some embodiments that provides for virtual storage 112. The system includes a playback device 114 that directly accesses one or more portable storage mediums 116, and that is in communication with a remote device 120. The portable storage medium can be substantially any relevant portable computer and/or processor readable storage medium, including but not limited to a optical disc (e.g., digital versatile disc (DVD), compact disc (CD), Blu-ray Disc (BD), high definition (HD) DVD, and other such optical discs), magnetic disc, flash card or drive, read only flash card, flash memory, secure digital (SD) card, universal serial bus (USB) stick or drive, other memory cards, and/or other such portable processor readable storage mediums. In some implementations the playback device 114 is coupled with a distributed network 122 through which the communication connection is established with the remote storage device 120. The virtual storage 112 extends beyond the playback device 114 to include the remote storage device 120, such as a remote computer or server, to augment the local storage of the playback device 114.

FIG. 1B depicts a simplified block diagram of a system 150 according to some embodiments that provides for virtual storage 112, where the virtual storage is distributed over one or more storage devices, such as one or more servers 120 and/or databases 124. Further, the virtual storage 112 may be accessible by multiple different playback devices 114. In some instances, two or more of these multiple playback devices may be associated, for example associated with a single user or user account. Further still, two or more of the playback devices are often unassociated and with each being associated with a different user and/or different user account. As such, the single virtual storage 112 provides, in part, a virtual database that stores content that can potentially be accessed and/or utilized by multiple different users and/or playback devices 114 that are related or unrelated and unassociated. Additionally, the virtual storage 112 can in some embodiments maintain one or more virtual storage tables or listings that identify and associate one or more content stored in the virtual storage 112 with each playback device 114 and/or user that has access to the virtual storage 112.

Figure 2:
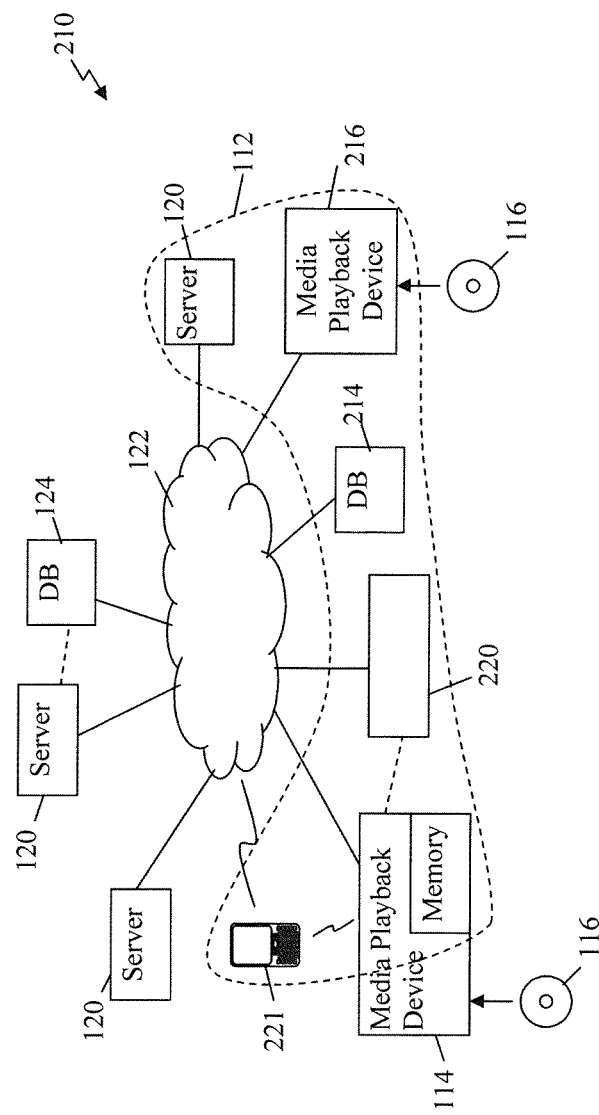
FIG. 2 depicts a simplified block diagram of a system according to some embodiments that provides for a virtual storage over multiple devices.

FIG. 2 depicts a simplified block diagram of a system 210 according to some embodiments that provides for a virtual storage 112 over multiple devices. The system 210 includes the playback device 114 that directly accesses the portable storage medium 116, and one or more additional device through which the virtual storage 112 can be extended. The virtual storage 112 can utilize memory of one or more devices that are in direct communication with the playback device 114 or in communication with the playback device over one or more local and/or distributed networks 122. For example, the virtual storage 112 may extend from the playback device 114 to one or more computers or servers 120, one or more databases 214, one or more other playback devices 216 that may or may not have direct access to portable storage mediums 116, one or more computers or other such device 220-221 (e.g., laptop computers, portable digital assistances, cellular phone, satellite phone, gaming device, and/or other such devices) that in some instances may also be playback devices, and other devices over a local network and/or a remote and distributed network.

In some instances, the playback device 114 may further be coupled with other servers 120, databases 214 and other such devices that are not part of the virtual storage but that can supply additional data, multimedia content, information, other content and the like to the playback device to be utilized in cooperation with playback in accordance with the portable storage medium 116 or other content. Further, the playback device 114 may be coupled with one or more of the server 120, database 214, other playback device 216 and other devices 220-221 through a distributed network 122 and/or through direct connections. Further, the communication over the distributed network 122 or through direct communication may be over wired or wireless communications. In some implementations the distributed network 122 can be a local area network, a home area network, a wide area network, the Internet or other such networks or combinations of such networks.

Figure 3:
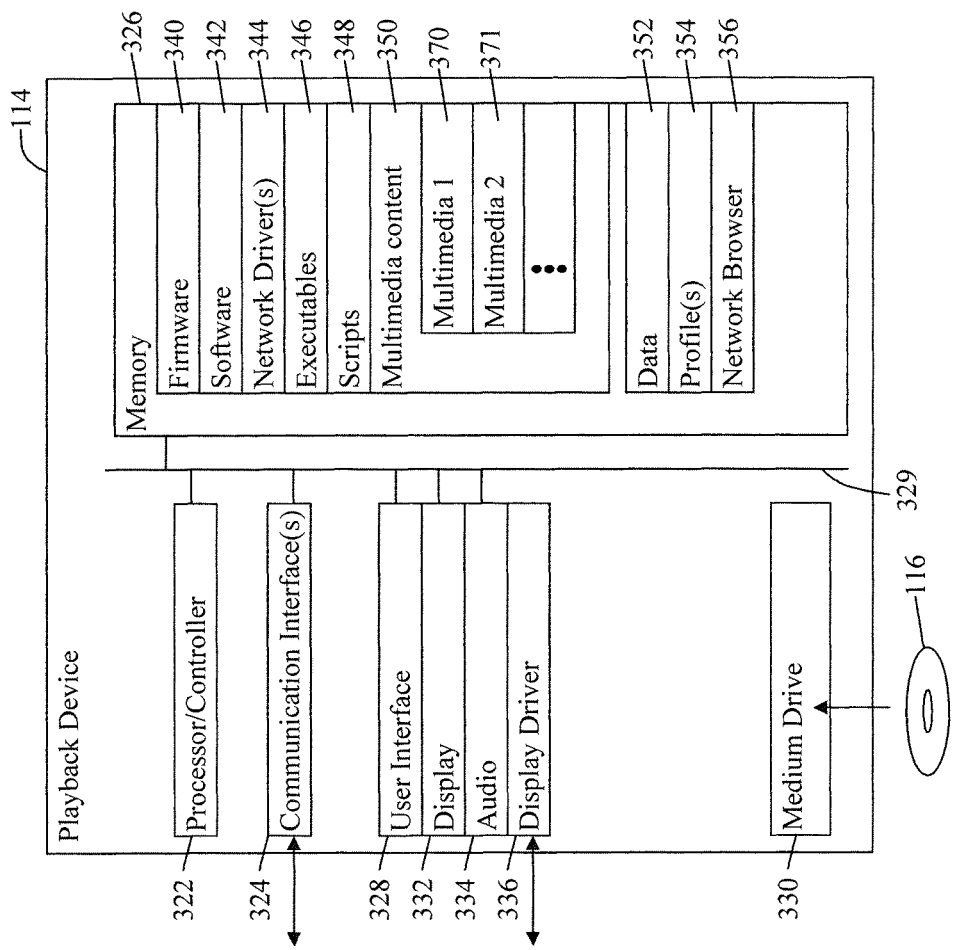
FIG. 3 depicts a simplified block diagram of a playback device according to some embodiments.

FIG. 3 depicts a simplified block diagram of a playback device 114 according to some embodiments. The playback device 114 includes one or more processors or controllers 322, one or more communication interfaces 324, one or more processor and/or computer readable storage 326, user interface 328 and other relevant components such as internal communication links and/or buses 329, and the like. The playback device 114 further includes relevant components for use in playing back content, such as one or more medium drives 330, one or more displays 332 and/or display drivers 336 (that provides information to a separate display device), one or more audio systems (e.g., audio drivers and/or one or more speakers) 334 and other relevant components.

The playback device 114 can be substantially any relevant playback device that can playback content from a portable storage medium, such as, but not limited to, a disc player (e.g., Blu-ray, high-definition digital versatile disc (HD-DVD), digital versatile disc (DVD), compact disc (CD), etc.), audio player, computer, a set-top-box, a TV, gaming console or controller, portable playback device and the like. The playback device controller 322 can be implemented through one or more microprocessors, processors, minicomputers or other such processing devices or combinations of devices programmed with executable instructions or that execute programming to access and implement the playback of the multimedia content and provide functional control of the playback device 114. In some embodiments, the playback device controller 322 includes video and/or audio processing functionality, such as decoders, encoders, demultiplexors, multiplexors, decryption devices, encryption devices, and the like; however, the video and/or audio processing functionality can be implemented through other modules of the playback device or separate devices cooperated with the playback device controller 322 such that at least some of the processing of content is initiated by the playback device controller 322 instructing other processing devices to perform some or all of the content processing. Additionally, in some instances, the playback device controller 322 includes communication functionality and/or directs additional devices to process received communications (e.g., communications from over the network 122, from a remote control device, and other such communications) and transmit communications. The communication interfaces 324 provides ports, interfaces, connections, antenna and/or the like through which the playback device 114 can communicate with other remote devices and/or over communication networks. The one or more communication interfaces 324 can include interfaces such as, but not limited to, a parallel port, an IEEE 1394 serial port, a game port, a USB port, Ethernet network port, an IR interface, RF interfaces, antenna or other such interfaces.

The memory 326 is coupled with the playback device controller 322 and typically includes one or more processor-readable and/or computer-readable mediums accessed by at least the playback device controller 322 and can include volatile and/or nonvolatile media, such as RAM, ROM, EEPROM, flash memory, cache memory or other memory technology. The memory can store firmware 340, software 342, network or communication drives 344, executables 346, scripts 348, multimedia content 350 (which may include previously received content 370-371, graphics, video, audio, images, and other such multimedia content), data 352 (which can include records, documents, databases, tables, logs, tracking information, correlating data, reports, statistics, and other such data), profiles and/or account information 354, playback device identification, network browser 356, network device ID and/or address, and the like.

A user interface 328 can be included in the playback device 114 that allows the user to interact with the playback device 114 and can include substantially any relevant interface, such as physical buttons, displays, lights, LEDs, an optical or radio communication interface for communicating with one or more remote controls, or other such user interfaces or combinations thereof. Further, the user interface 328 can further include user interfaces displayed on the display 332 or a display coupled with the playback device 114, such that the playback device receives selections and/or commands corresponding with options and/or fields displayed through the user interface. The display 332 can be substantially any relevant display such as, but not limited to, a cathode ray tube display, a liquid crystal display (LCD), plasma display panel, light emitting diode display, and other relevant displays. Similarly, the audio 334 can be substantially any relevant audio drive, device and/or system, such as one or more speakers, speaker drivers and the like. Some embodiments further include a display driver 336 that can supply and/or drive one or more separate display devices, such as a television, a computer monitor or other such display. The one or more medium drives 330 receive a portable storage medium 116 and allows the playback device controller 322 or other relevant components of the playback device 114 to access content stored on the medium 116. The portable storage medium 116 can be substantially any tangible, non-transitory, portable computer or processor readable medium, such as a disc, flash memory and other such memory as described above.

Figure 4:
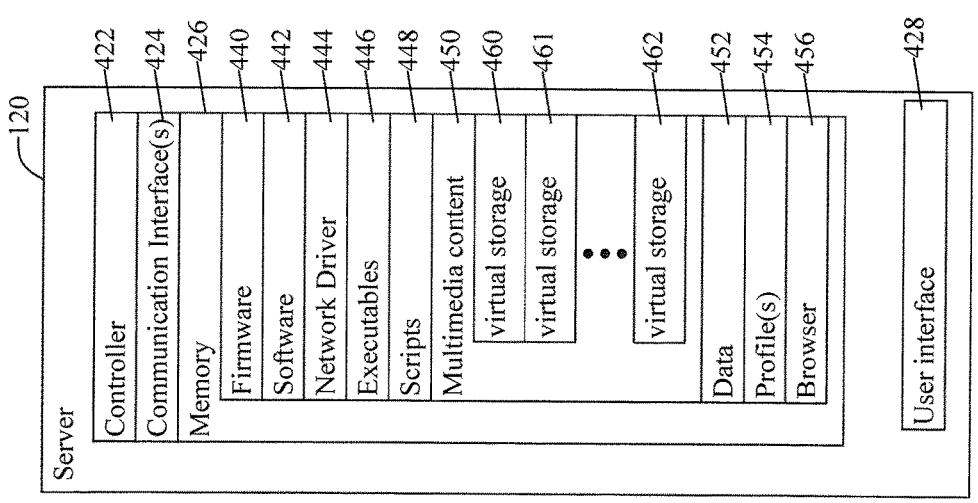
FIG. 4 depicts a simplified block diagram of a remote source according to some embodiments that can communicate over the distribute network with a playback device.

FIG. 4 depicts a simplified block diagram of a remote source 120, such as a network device or server, according to some embodiments that can communicate over the distribute network 122 with the playback device 114 to at least forward and/or receive content. The remote device 120 can be implemented through a computer, server or other data processing device and includes one or more processors or controllers 422, one or more communication interfaces 424 and one or more local processor and/or computer readable storage 426. In some instances the remote device 120 can be similar to or the same as the playback device 114 of FIG. 2. Some embodiments optionally include user interface 428 (which may include a display and/or audio) and other relevant components such as internal communication links and/or buses (not shown), and the like.

The server controller 422 can be implemented through one or more microprocessors, processors, minicomputers or other such processing devices or combinations of devices. In some embodiments, the server controller 422 includes video and/or audio processing functionality, such as decoders, encoders and the like; however, the video and/or audio processing functionality can be implemented through other modules of the server or separate devices cooperated with the server controller 422. The communication interface 424 provides one or more interfaces, ports, connections, antenna and the like through which the remote device 120 can communicate over the distributed network 122. Additionally, in some instances, the communication interface 424 provides communication with one or more remote databases and/or data storage devices 214. These communication interfaces can include interfaces such as, but not limited to, a parallel port, an IEEE 1394 serial port, a USB port, an IR interface, RF interfaces, antenna or other such interfaces.

The memory 426 is coupled with the server controller 422 and typically includes one or more processor-readable and/or computer-readable mediums accessed by at least the server controller 422 and can include volatile and/or non-volatile media, such as RAM, ROM, EEPROM, flash memory or other memory technology. The memory can store firmware 440, software 442, network or communication drives 444, executables 446, scripts 448, content 450, data 452 (which can include records, documents, databases, tables, logs, tracking information, correlating data, reports, statistics, and other such data), profiles and/or account information 454, a network drive and/or browser 456, and the like. The content 450 may include substantially any type of content and can include one or more virtual storage and/or parts of one or more virtual storage 460-462, which again can include substantially any relevant content, tables, data and/or other relevant content.

Figure 5:
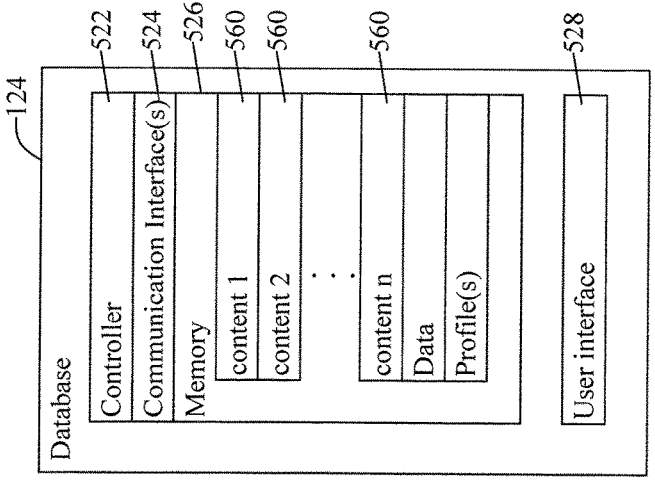
FIG. 5 depicts a simplified block diagram of a database or other data storage device that, at least in part, can store content, and in some instances be part of a virtual storage.

FIG. 5 depicts a simplified block diagram of a database 124, other network device or other data storage device (e.g., data storage 214) that, at least in part, can store content, and in some instances be part of a virtual storage 112. The database 124 includes one or more database processors or controllers 522, one or more communication interfaces 524, and processor and/or computer readable storage 526. The database 214, in some instances, can include a user interface 528 (which may include a display and/or audio) and other relevant components such as internal communication links and/or buses (not shown), and the like.

The database controller 522 can be implemented through one or more microprocessors, processors, minicomputers or other such processing devices or combinations of devices. In some embodiments the database controller 522 includes video and/or audio processing functionality, such as decoders, encoders and the like; however, the video and/or audio processing functionality can be implemented through other modules or separate devices cooperated with the database controller 522. The communication interfaces 524 provide interfaces, ports, connections, antenna and the like through which the database 214 can communicate over the distributed network 122 and/or directly with a coupled device such as a server 120. These communication interfaces can include interfaces such as, but not limited to, a parallel port, an IEEE 1394 serial port, a USB port, an IR interface, RF interfaces, antenna or other such interfaces.

The memory 526 is coupled with the database controller 522 and typically includes one or more processor-readable and/or computer-readable media accessed by at least the database controller 522 and can include volatile and/or nonvolatile media, such as RAM, ROM, EEPROM, flash memory or other memory technology. The memory 526 stores one or more content 560 that can be incorporated into one or move virtual storage. The memory, in some embodiments, can include multimedia content, records, documents, databases, tables, logs, tracking information, correlating data, reports, statistics, profiles and/or account information, and other such content. In other embodiments, the database 124 can be similar to or the same as the server of FIG. 4 or in some instances is similar to the playback device 114 of FIG. 3.

The playback device 114 can utilize the remote server 120, database 214 and/or other device to establish and maintain a virtual storage 112 that can be utilized by the playback device in storing and retrieving content to be utilized in playback with portable storage mediums 116. By expanding the available memory of the playback device the playback experience associated with a portable storage medium 116 can be enhanced. Additionally, users can retain content through the virtual storage that could otherwise not be kept or that may have degraded the playback experience if maintained on the local memory 326 of the playback device 114. As such, the virtual storage 112 allows a playback device and/or user to keep track of content while allowing improved performance and/or a playback experience by, at least in part, pushing content from the local storage 326 to other devices of the virtual storage 112, and pulling that content back down to local storage when beneficial or needed.

Figure 6:
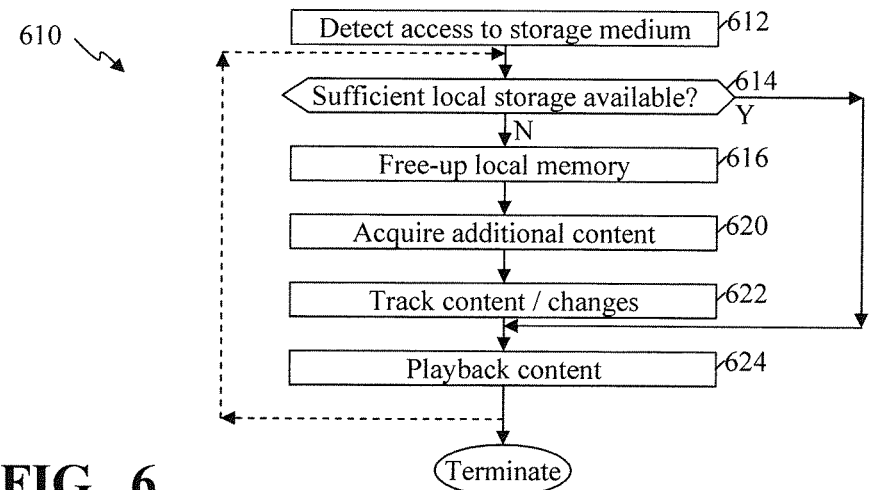
FIG. 6 depicts a simplified flow diagram of a process, according to some embodiments, that allows a playback device to take advantage of a virtual storage.

FIG. 6 depicts a simplified flow diagram of a process 610 according to some embodiments that allows a playback device 114 to take advantage of a virtual storage 112. In step 612, access is detected at the playback device 114 to a portable storage medium 116. For example, the portable storage medium 116 may be inserted into the medium drive 330 of the playback device providing the playback device with direct access to the portable storage medium, the portable storage medium may be inserted into a port of the playback device or detecting other such access.

In step 614, it is determined whether there is sufficient local storage 326 on the playback device 114 to allow playback of content in association with the portable storage medium 116. As introduced above, in some implementations, the playback device 114 may utilize and/or playback additional content in association with the portable storage medium 116. This additional content may be acquired from separate sources, such as remote source 120, 214 and/or playback devices 216, 220-221, and at least temporarily stored locally on the playback device 114. As such, the availability of local memory 326 on the playback device 114 may have an affect on the ability to playback the additional content and/or the playback experience associated with the portable storage medium. One or more factors can be taken into account when determining whether the local memory 326 on the playback device can support playback in association with the portable storage medium. These factors can include, but are not limited to, evaluating the content on the first portable storage medium, determine an amount of additional content to be acquired in association with the portable storage medium, an amount of available local memory 326, an whether some or all of the local memory can be freed up, a minimum amount of local memory needed, and other such factors. In those instances where it is determined that sufficient memory is available the process 610 advances to step 624 to initiate and/or continue playback, or alternatively the process may terminate. In some embodiments, the determination of an amount of available local memory desired may be limited to a single identified additional content, while the portable storage medium or a playlist may identify multiple additional contents such that the determination of an amount of available memory is performed on a content by content basis.

When sufficient memory is not available, step 616 is entered where an amount of the local memory 326 is freed up by moving content from the local memory to the virtual storage 112 and/or by deleting content from the local memory. In step 620, the acquisition of the additional content is initiated from the virtual storage 112 and/or the one or ore remote sources 120, 214, and some or all of the acquired additional content is locally storing in the freed up local memory. As described above and further below, the portable storage medium 116 may identify additional content to be played back in cooperation with the portable storage medium or a revised playlist associated with the portable storage medium may identify additional content. As such, step 620 acquires the identified additional content from the virtual storage 112 and/or from a remote source 120 when the content is not already stored on the local memory 326.

In step 622, the deletion of content, the movement of content to the virtual storage 112 and/or the acquisition of additional content is logged, tracked or otherwise recorded. In step 624, playback of content in cooperation with the portable storage medium 116 is initiated. Again, the content played back can be from the portable storage medium 116, acquired and locally stored, downloaded, progressively downloaded, streamed or otherwise acquired. In some embodiments, the process 610 may return to step 614 to determine whether further space needs to be made available, for example, to make memory available for the acquisition of subsequent additional content to be played back in association with the portable storage medium 116.

By freeing up local memory 326 the process 610 allows additional content to be locally acquired and played back in association with the portable storage medium. The freeing up of the local memory, however, can be performed without losing the content because the content can be moved to the virtual storage 112 allowing it to be readily reacquired. Additionally, the location of the content can be tracked so that it can be located quickly and pulled back to the playback device 114 with minimal delays. Further, by effectively expanding the memory of the playback device and providing the virtual storage 112, the playback device can limit or avoid the need to have to go back to an original source for content. In addition, maintaining content in the virtual storage 112 can avoid having to again obtain authorization to gain access to content that was previously acquired. Still further, the reacquisition of the content from the virtual storage may be obtained as a background download based on what portable storage medium 116 is being accessed by the playback device 114. Similarly, the identification of content from the virtual storage 112 may be simplified, in some embodiments, by associating content on the virtual storage with one or more portable storage mediums 116 so that content can easily be identified and forwarded to the playback device based, at least in part in some implementations, on an identification of the portable storage medium 116. The freed up local memory 326 can then be utilized to store some or all of the identified content to, at least in part, improve the playback experience.

In some embodiments, the process 610 is implemented on the playback device 114 through the execution of one or more applications, programs, software and/or executables retrieved from the portable storage medium 116. Additional functionality may be provided through the execution of additional programs, software and/or executables obtained from one or more remote sources 120, 214. In other embodiments, the playback device 114 implements an application stored on the portable storage medium 116 that directs the playback device to access a remote source 120 that in turn provides one or more additional applications, programs and/or software that can be utilized at least in part in implementing the process 610.

Further, in some instances, the process 610 is implemented upon an initial access to the portable storage medium. For example, the process is activated as one of the first processes implemented by the playback device upon detecting an initial access to the portable storage medium 116 (e.g., medium being inserted into the playback device). As such, the process can obtain content to be used in cooperation with the portable storage medium, and further can attempt to reduce or eliminate delays that may result from obtaining content from the virtual storage 112 or a remote source 120, and/or moving content to the virtual storage. In some embodiments, the process 610 can be implemented as part of pre-playback process in obtaining pre-roll content that is not recorded on the portable storage medium 116 and can be substantially any relevant content to be played back in cooperation with the portable storage medium. Further, the pre-roll content can include content to be played back in advance of at least a main title content recorded on the portable storage medium or the content with which the portable storage medium is most associated (e.g., a main movie title). In allowing access to pre-roll content some embodiments provide current and relevant content that can be played back in cooperation with the portable storage medium, and in some instances in place of content recorded on the portable storage medium, while reducing an adverse user experience due, in part, to delays in obtaining the pre-roll content. The use of pre-roll content can be implemented, in some embodiments, in accordance with one or more of the embodiments described in U.S. patent application Ser. No. 13/291,891, entitled METHODS AND SYSTEMS FOR USE IN CONTROLLING PLAYBACK OF CONTENT IN RELATION TO RECORDED CONTENT, to Bruce Randall, filed Nov. 8, 2011, which is incorporated herein by reference in its entirety.

Figure 7:
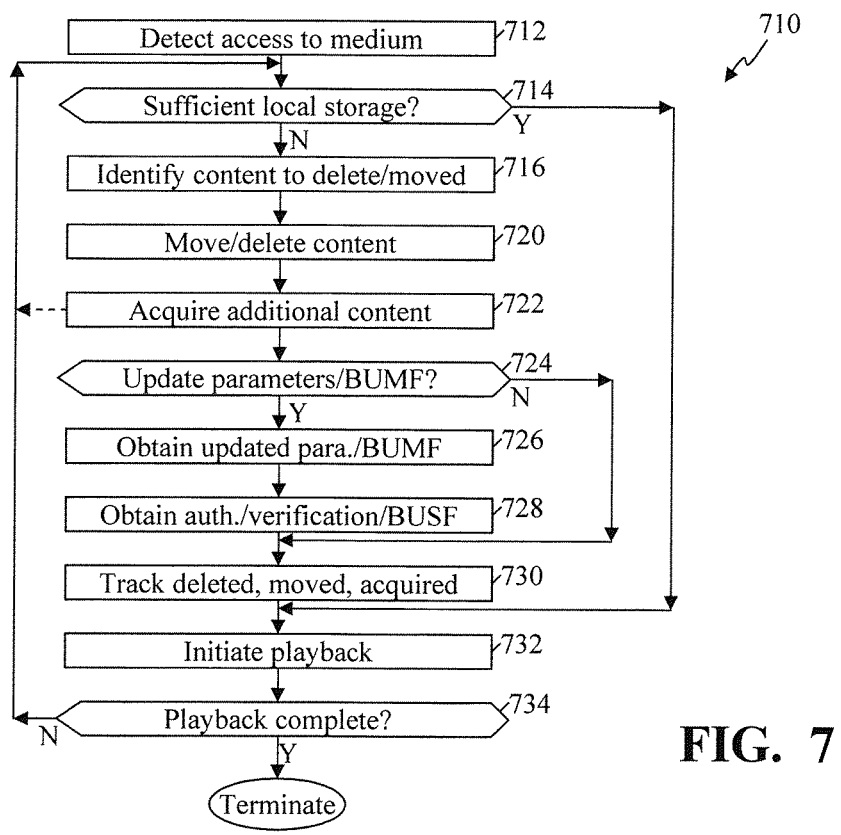
FIG. 7 depicts a simplified flow diagram of an additional or alternative process, according to some embodiments, of freeing up at least some of the local memory of a playback device and acquiring content from a virtual storage, or in some instances other remote sources.

FIG. 7 depicts a simplified flow diagram of an additional or alternative process 710, according to some embodiments, of freeing up at least some of the local memory 326 of the playback device 114 and acquiring content from the virtual storage 112, or in some instances other remote sources 120, 214. In step 712, access to a portable storage medium 116 is detected at the playback device 114. In step 714, an evaluation of the portable storage medium and the content on the portable storage medium is implemented to determine whether there is sufficient storage on the local memory 326 of the playback device to implement playback of content in association with the portable storage medium. As introduced above, the portable storage medium 116 may identify additional content that is intended to be played back in association with the portable storage medium. Similarly, the portable storage medium may identify one or more remote sources 120, 214 from which additional content may be acquired. Further still, the playback device 114 may have knowledge of a remote source, such as a default remote source that may be accessed to determine whether additional content may be available to be played back in association with the portable storage medium. As such, the process can attempt to identify additional content that may be available and associated with the portable storage medium 116, and determine whether there is sufficient available local memory to receive the additional content to provide a desired playback. In some instances, not all of an additional content is stored locally at a give time, but instead may be streamed or progressively downloaded. In these instances, however, it may be desirable to store at least some of the content to provide some margin for delays in obtaining and/or processing the received additional content, and in some instances provide a window of content to allow a user to implement searching or skipping through content being played back either in forward or reverse.

When it is determined in step 714 that there is sufficient local memory to implement a desired playback the process advances to step 732 to initiate playback in association with the portable storage medium 116. Alternatively, when the available or amount of freed local memory is insufficient, the process 710 continues to step 716 to identify one or more contents stored on the local memory 326 that may be potentially be deleted or moved to the virtual storage 112 to free-up local memory. In step 720, one or more of the identified locally stored contents are deleted and/or moved to virtual storage 112 freeing up a desired amount of local memory 326.

In step 722, acquisition of the additional content from virtual storage 112 and/or the one or more remote sources 120, 214 is initiated and the acquired additional content is stored in the freed up local memory 326. In some instances, the acquisition of additional content may further define or clarify the amount of freed up memory that may be wanted to achieve a desired playback experience. As such, the process 710 in some instances may returning to step 714 to determine whether further space needs to be made available.

In some embodiments, step 724 is entered to determine whether updated parameters, playlists and/or other such information and/or files are needed to effect playback of content in association with the portable storage medium 116. For example, with Blu-ray discs (BD), in accordance with the BD specification, an updated Binding Unit Manifest File (BUMF or BMF) is typically needed to reflect what content is stored locally at the playback device and what content is stored remotely for content intended to be played back in association with the portable storage medium 116. As such, an updated BUMF file is acquired in step 726 when needed. Further, there may be some authorizations, certification and/or authentications that are needed to allow playback. For example, in accordance with the BD specification a Binding Unit Signature File (BUS) corresponding to the BUMF file should also be obtained to authenticate the updated BUMF file. As such, in step 728 authentication, verification and/or authorization is obtained when needed to effect playback.

In step 730, the deletion of content from local memory 326, the movement of content to virtual storage 112 and/or the storing of content to local memory is logged, tracked or otherwise recorded, such as in a log or tracking, file table or database. This can include storing location information of where the content is stored. In some instances with content that is deleted, the tracking may include maintaining an identification of and/or access to a source, such as an original source from where the content was acquired. Further, the tracking may also store access and/or authorization information for the content. Other information and parameters may also be maintained with the tracking information, such as an identification of one or more portable storage mediums with which the content is associated, an identification of one or more playback devices through which the content is authorized to be played back, and other relevant information.

In step 732, playback in association with the portable storage medium is initiated. Again, this may include playing back content from the portable storage medium 116, content stored on the local memory 326 and/or content received from a remote source 120, 214, such as through progressive downloading and/or streaming. The process may then advance to step 734 to determine whether playback has completed. When playback is complete the process terminates. In some embodiments, when the playback has not completed the process 710 may return to step 714 to determine whether local memory may need to be further freed up. For example, it may be determined that additional content that was previously received, for example in step 722, and played back in association with the portable storage medium 116 actively being accessed may be moved to virtual storage and/or deleted to continue to free-up local memory 326 to allow the acquisition of yet further additional content. As an example, a first portion of a first additional content may be acquired in step 722, and as further portions of the first additional content are to be received the first portion is moved to the virtual storage 112 or deleted to free up local memory space to receive the further portions of the first additional content. As another example, a first additional content may be moved to the virtual storage 112 to free up memory to retrieve a second additional content from the virtual storage or a remote source 120.

Figure 8:
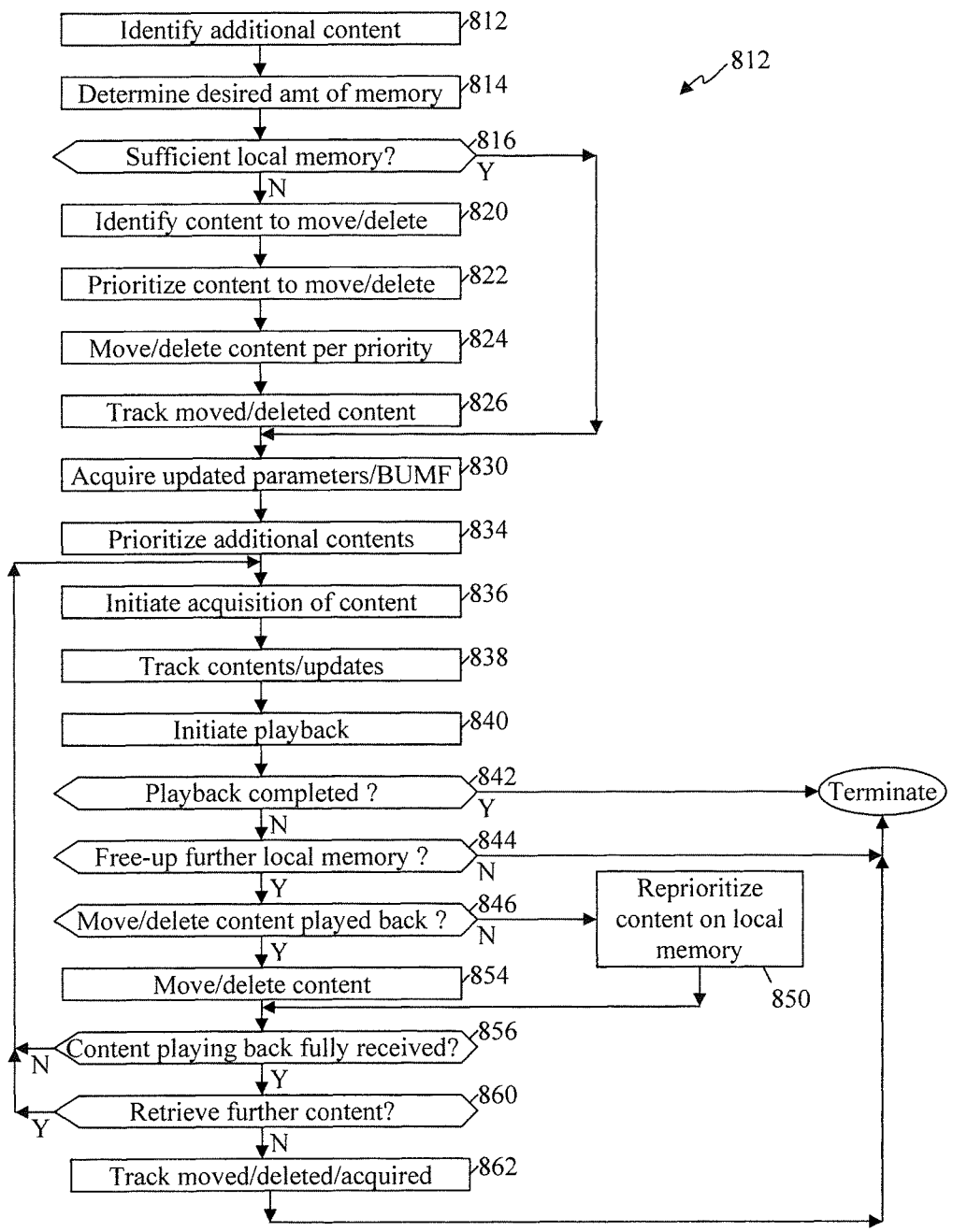
FIG. 8 depicts a simplified flow diagram of a process for use in managing the local memory of a playback device prior to and during playback of content in association with a portable storage medium being accessed by the playback device.

FIG. 8 depicts a simplified flow diagram of a process 810 for use in managing the local memory 326 of the playback device prior to and during playback of content in association with the portable storage medium being accessed by the playback device. In some embodiments, the process 810 may implement some or all of steps 614 and 620 of the process 610 of FIG. 6, and/or steps 714, 720 and 722 of the process 710 of FIG. 7. In step 812, additional content to be played back in association with the portable storage medium is identified. The identification can be based on information from the portable storage medium 116, a playlist (or updated playlist or other updated information), or other sources that can identify additional content to be played back in association with the portable storage medium 116. The additional content may already be locally stored on the local memory 326, may have been previously obtained and moved to virtual storage 112, and/or may be obtained from one or more remote sources 120, 214. In some instances, the location of the additional content may be determined from tracking information at the playback device 114 or a remote source 120. With some other content, the portable storage medium 116 may identify a remote source or provide a network address to the remote source, a remote source 120 may specify another remote source, such as a database 214, where the additional content may be acquired, or other such designations.

In step 814, an amount of local memory to provide playback of content in association with the portable storage medium 116 is determined. The amount of memory desired may vary depending on many factors, such as an amount of memory specified by the portable storage medium 116, communication bandwidth and/or playback device capabilities (e.g., buffer characteristics, decoding capabilities and the like), size of content to be obtained, and other such factors. Additionally, when additional content is to be received via streaming or progressive download an amount of local memory to provide for effective playback may be determined.

In step 816, it is determined whether there is sufficient local memory 326 available to locally store the desired additional content to provide for the desired playback experience. When it is determined that there is sufficient memory, the process advances to step 830. Alternatively, step 820 is entered to identify content on the local memory 326 that may potentially be deleted or moved to the virtual storage 112. This determination can be based on metadata and/or parameters associated with the content. Further, some content may be restricted from being moved or deleted in association with the portable storage medium being accessed, but could be moved or deleted in association with a different portable storage medium. For example, a first portable storage medium may be associated with a first content owner (e.g., a first movie studio) while a second portable storage medium may be associated with a second content owner (e.g., a second movie studio). As such, the first content own may not authorize additional content locally stored on the playback device in association with the first portable storage medium to be deleted when the playback device is accessing the second portable storage medium associated with the second content owner; however, the additional content locally stored on the playback device and associated with the first portable storage may be moved or deleted when the playback device is accessing a third portable storage medium associated with the content owner.

Further, in some instances a user of the playback device may designate that content locally stored should not be deleted or moved. Similarly, a remote source 120 may designate that content should not be deleted or moved from the local memory 326. In some embodiments, the priorities and/or rights associated with a content locally stored on the playback device may be defined with the content (e.g., metadata), may be stored in one or more tracking records or logs, the local memory 326 may be segregated or other such indications of authorization to delete or move content.

In step 822, the one or more contents identified as being available to be deleted or moved to virtual storage 112 are prioritize. This priority can be based on one or more factors as further outlined below, but can include specifications or designations from a user or source of the content, date of the content, expirations of content, regularity of use of content, most recently used, most infrequently used, ability to readily reacquire the content from another or an original source, and other such factors. Once a priority is identified, step 824 is entered where a content stored in local memory 326 of the playback device is moved to virtual storage 112 or deleted in accordance with their priority to free up at least a desired minimum amount of local memory. In step 826, the log or tracking information is updated corresponding to the one or more contents that were deleted and/or moved to the virtual storage 112. The tracking, in some instances, can further include obtaining information about where the content is moved, memory address information, information about where the content may be reacquired (e.g., a network address of an original source), authorizations and/or authentications to acquire or retrieve the content and/or other such information.

In some embodiments, the process 810 includes step 830 where updated parameters, playlists and/or other such information in implementing playback of content in association with the portable storage medium 116 are acquired, and authorizations and authentications are obtained. As introduced above, some embodiments may obtain an updating BUMF file and/or BUS file.

In step 834, the identified additional contents are prioritized with respect to storing the additional content to the local memory 326 of the playback device. The priority of the additional content is determined, at least in part, based on relative playback timing with those additional contents intended to be played back before other additional contents typically having a higher priority than those intended to be played back later in the playback sequence. The order of playback may be defined by a playlist or other such information, where the playlist may be defined on the portable storage medium or an updated playlist may have been provided from a remote source 120 in association with the portable storage medium being accessed at the playback device 114. It is noted, however, that in many instances a user may dynamically alter playback, for example, by selecting to playback a specific additional content or skipping content. As such, the priorities of these contents may not be restricted to playback timing, and often the priorities may vary during the playback experience. Further, some additional content may be designated to be received via streaming or progressive download, or may be too large to store locally. As such, these additional contents may be given lower priorities or these contents may be given a high priority while only a minimal portion of these additional contents are actually stored on the local memory 326.

In step 836, the acquisition of one or more of the additional content is initiated and/or an identification of where the additional content is to be acquired is determined. This acquisition may include the acquisition and local storing of only a portion of the one or more of the additional content, may include acquiring all of one or more additional content while other additional content waits to be acquired when further local memory can be made available, and/or other such scenarios.

In step 838, the acquisition of one or more additional contents are tracked and/or logged as described above and further below. This tracking, in some instances, can include recording or logging the storage locations and/or memory access of content (which can include local storage 326, virtual storage 112, access from a remote source or the like), the identification of a remote source for content acquired from a remote source or to be acquired from a remote source and other such information. Additionally, the tracking can track updated parameters (e.g., updated BUMF and BUS files) and/or other such changes can be similarly tracked and/or logged. In step 840, playback in association with the portable storage medium 116 is initiated. This playback can be dictated by a playlist on the portable storage medium, dictated by an updated playlist obtained from a remote source 120 as a result of a playback device 114 obtaining access to the portable storage medium, instructions received from a user or other such playback instructions and/or criteria, or combinations thereof. The process 810 can then advance to step 842 to determine whether playback in association with the portable storage medium has completed. This may be based on a user interrupting playback, a completion of playback in association with a playlist or other such terminations. In those instances where playback is complete the process terminates.

When playback is not complete the process may continue, in some embodiments, to step 844 to determine whether further local memory 326 should be freed up. Again as introduced above, there may be insufficient local memory or insufficient amounts of local memory may not be able to be freed up to locally store all of the additional content. Similarly, some of the content may be intended to be streamed or progressively downloaded and as such only a limited window of content is maintained on the local storage 326 at a give time during playback. As such, portions of the local memory 326 may need to continue to be freed up during playback so that subsequent additional content and/or subsequent portions of additional content may be acquired. When it is determined in step 844 that further local memory does not need to be freed up the process terminates.

Alternatively, when additional portions of the local memory 326 are to freed-up step 846 is entered to determine whether additional content or portions of additional content previously playing back during the current playback experience can be moved to the virtual storage 112 or deleted. When the additional content cannot be moved to virtual storage or deleted the process continues to step 850 to reprioritize the content stored on the local memory 326 in relation to deleting and/or moving content to the virtual storage, and content is either deleted or moved. Step 850 may be similar to steps 822, 824 and 826. The process then advances to step 856. Alternatively, when the content being received can be moved step 854 is entered where the additional content is moved to the virtual storage or deleted, and the transfer to the virtual storage 112 and/or deletion is tracked and/or logged, again which may include an identification of the content, a memory location to where the content was moved and/or other such information.

In step 856 it is determined whether currently playing back additional content has been fully received. When the content has not be fully received the process returns to step 836 to continue acquiring the content. Alternatively, step 860 is entered to determine whether further additional content is to be received. When further additional content is to be received the process again returns to step 836 to retrieve the content based on the priority. In step 862, the acquisition of the additional content, the deletion of content and/or the movement of content to the virtual storage 112 is logged and/or tracked. Similarly, the playback of content from the portable storage medium and/or additional content can be logged and/or tracked. This can include tracking which content and/or a version of content was played back, a number of times content was played back, whether portions of the content were replayed, whether content or portions of content were skipped or fast-forwarded over, and other such factors or viewing parameters.

Figure 9:
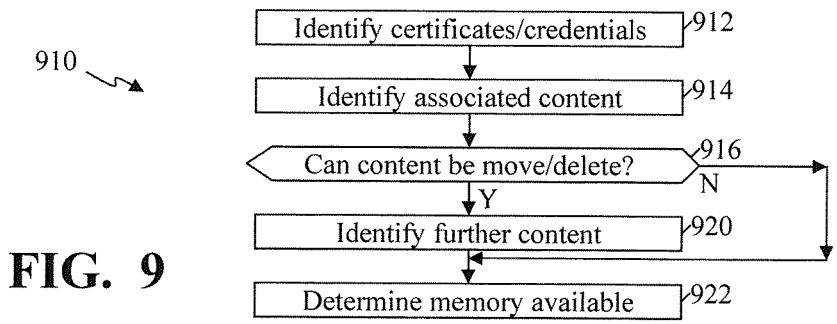
FIG. 9 depicts a simplified flow diagram of a process according to some embodiments of identify an amount of content on the local memory of a playback device that can be moved to a virtual storage or deleted.

FIG. 9 depicts a simplified flow diagram of a process 910 according to some embodiments of identify an amount of content on local memory 326 that can be moved to virtual storage 112 or deleted. In some embodiments, the process 910 can be used to implement some or all of step 820 of FIG. 8. In step 912, one or more certificates, credentials or other authorizations recorded on the portable storage medium 116 are identified. The one or more certificates, credentials or other authorizations allow the playback device to identify other content recorded on the local storage 326 that have some certified relationship with the portable storage medium. For example, the certificate or certificates can allow the playback device to identify other content recorded on the local storage 326 that correspond to a content owner of content on the portable storage medium (e.g., a movie studio), a production company associated with the content recorded on the portable storage medium and/or a distribution company associated with the portable storage medium. As another example, a main title on a portable storage medium might be content owned by a first movie studio. As such, the portable storage medium may include a certificate that can be used to identify other content recorded on the local memory 326 that are also owned by the first movie studio. Further, the certificate may provide the playback device with the authority to delete or move content associated with the first movie studio.

When one or more certificates are identified the process continues to step 914 where locally stored content associated with each of the one or more certificates are identified. In step 916, it is determined whether further locally stored content can be moved or deleted. For example, the process may identify expired content that no longer need authorization to be deleted or moved, content may be locally stored that is not associated with a certificate and other such identifications.

When it is determined in step 916 that no further content is available to be moved or deleted, the process advances to step 922. Alternatively, step 920 is entered to identify those locally stored content that can be moved and/or deleted. The process 910 then continues to step 922 to determine an amount of memory that can be made available based on the identified content associated with the certificates as well as the further content that may be moved or deleted.

Figure 10:
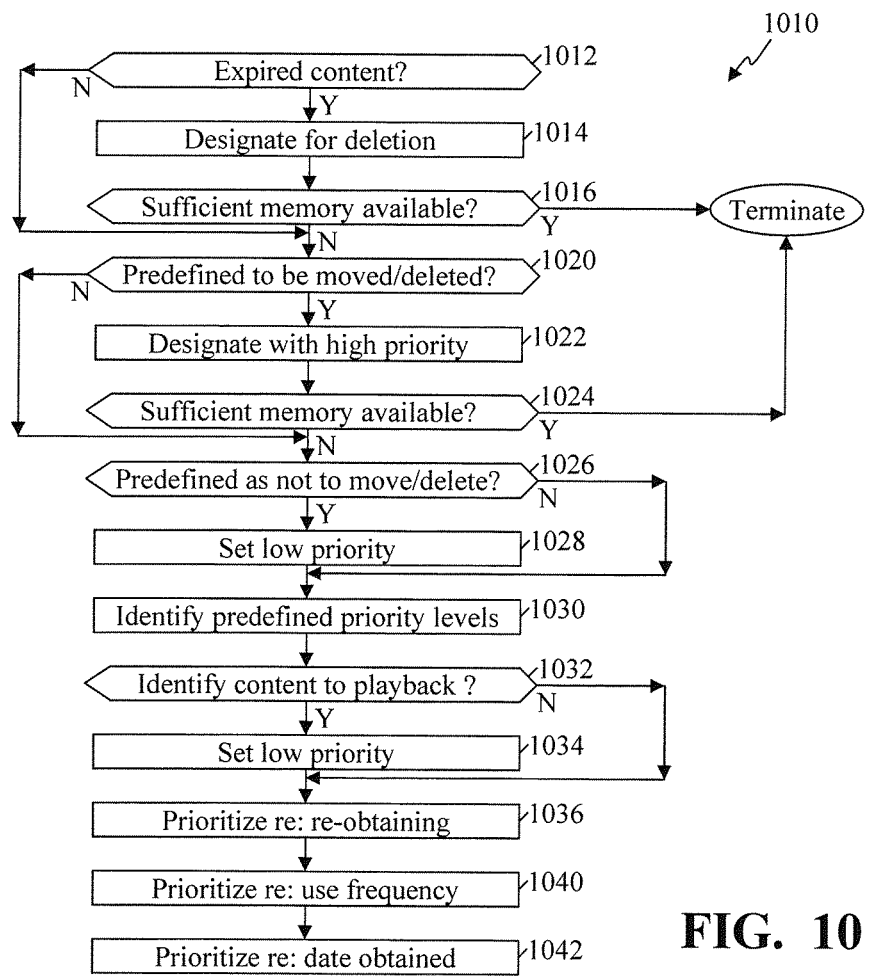
FIG. 10 depicts a simplified flow diagram of a process according to some embodiments for use in prioritizing content in determining which one or more potential contents that are stored on the local memory of a playback device are to be deleted or moved from the local memory to a virtual storage.

FIG. 10 depicts a simplified flow diagram of a process 1010 according to some embodiments for use in prioritizing content in determining which one or more contents that are stored on the local memory 326 of the playback device 114 are to be deleted or moved from the local memory 326 to the virtual storage 112. In some embodiments, the process 910 can be used to implement some or all of step 822 of FIG. 8. In step 1012, it is determined whether one or more of the content recorded on the local memory 326 have expired. When none of the identified content have expired the process advances to step 1020.

Alternatively, when one or more of the identified contents have expired step 1014 is entered where each of the one or more identified content that has expired are specified to be deleting. In some instances, this may include setting or associating these contents with a highest priority level with respect to content to be deleted or moved, while in other instances, they may not be set with a priority and instead simply identified a content to be deleted. The identification of expired content may, in some embodiments, be limited in step 1012 to those content identified as available to be moved or deleted, such as those contents identified in process 910, while in other embodiments such limitations may not be applied to at least some expired content. In step 1016 it is determined whether a desired, minimum and/or sufficient amount of local memory 326 would be available upon deletion of the one or more contents identified as expired. When a sufficient amount of memory would become available the process then terminates, and in some embodiments may return to step 824.

In step 1020 it is determined whether one or more of the contents that can be moved or deleted have been designated, labeled or predefined to be deleted or moved to virtual storage 112. This predefined designation may result from a user previously identifying content to be moved or deleted. Similarly, a prior portable storage medium accessed by the playback device 114 may have identified content locally stored on the local memory 326 that could be deleted or moved. When content has been specified to be deleted or moved step 1022 is entered where each of the one or more content that have been predefined to be deleted are given a highest level priority for deleting, and each of the one or more content that have been predefined to be moved to virtual storage are given a highest level priority for moving to the virtual storage. In step 1024 it is determined whether a desired, minimum and/or sufficient memory would be available upon deletion and/or movement of the one or more contents predefined to be moved and/or deleted. When sufficient local memory 326 would be available the process 1010 terminates, and in some embodiments returns to step 824 to initiate the deletion and/or movement.

When it is determined in step 820 that content is not predefined to be moved or deleted, and when it is determined in step 824 that it is desirable to free up further local memory 326, the process continues to step 1026 to determine whether one or more of those contents that can be moved or deleted (e.g., according to certificate) are designated as not to be moved or deleted. In some instances, one or more contents may be designated by a user, a secondary source 120 or the like as not to be moved or deleted. When one or more content have been designated as not to delete and/or move or otherwise protected step 1028 is entered where such content are applied a zero priority such that they are not moved or deleted.

In step 1030, the one or more contents that can potentially be moved or deleted are evaluated and/or metadata associated with these contents are evaluated to identify contents, if any, that include a predefined priority level. In some instances, content can contain a predefined priority level regarding being deleted or moved from the local memory 326. For example, predefined priority levels might be set by the portable storage medium, a remote source, a user or the like. This allows a content owner to maintain some control over the content. Further, in some instances, the predefined priority may vary over time. For example, a content can have a relatively high priority such that it is likely not going to be moved or deleted while the content is relatively new. As time passes, however, the priority of that content may decrease as the relevance and/or importance of that content drops over time. In step 1032, it is determined whether one or more of those contents that can be moved or deleted are to be utilized with and/or played back in association with the portable storage medium 116 being directly and locally accessed by the playback device. Again, this can be defined by the portable storage medium 116 (e.g., in a playlist or BUMF), defined by a remote source 120 (e.g., through a revised or updated playlist, an updated BUMF or other such designation), or through other such indications. The process advances to step 1036 when identified locally stored content is not intended to be played back with the portable storage medium.

When it is determined that one or more of the contents that can be moved or deleted are to be utilized with and/or played back in association with the portable storage medium 116 the process continues to step 1034 where the identified one or more contents to be used with the currently accessed portable storage medium are designated with a lowest priority such that these content are likely not to be moved or deleted. For example, the movement of these content to the virtual storage 112 may be limited to an event where local memory is need and otherwise cannot be acquired and there is other content to be utilized with the portable storage medium that has a higher playback priority than the content already locally stored. In step 1036, the content identified that can potentially be moved or deleted are further prioritized, for example, in relation to most easily re-obtained from a remote source 120, 214, such that content that can more readily be obtained from an alternate source are prioritized at a higher priority to be moved or deleted. In some embodiments, when a source or the likelihood of being able to reacquire the content is unknown or cannot be readily determined the content can be provided with a lower priority with regard to being moved or deleted. The prioritizing regarding the easy of reacquiring the content can be applied to content already prioritized such that contents that have the same priorities can further be prioritized in relation to each other. In step 1040, the content is further prioritized or ranked based on frequency of use such that those content less used are given a higher priority to be moved or deleted. It is noted that this prioritization can be applied to any locally stored content, including content that has already been given some level of priority. As such, content having similar priorities can further be prioritized in relation to each other as well as other content based on additional criteria. In step 1042, the locally stored content is further prioritized as a function of date obtained, such that those content more recently obtained are given lower priorities to be moved or deleted relative to older content. Again, this prioritization takes into account previous priorities. It is noted that additional or alternative prioritizations can be applied. For example, priorities can be defined depending on one or more of data size, image and/or playback quality (e.g., in relation to content on the portable storage medium), date content was last utilized or played back, anticipated use (e.g., based on user profile, genre, performers, actors, directors and the like), and other such factors.

Figure 11:
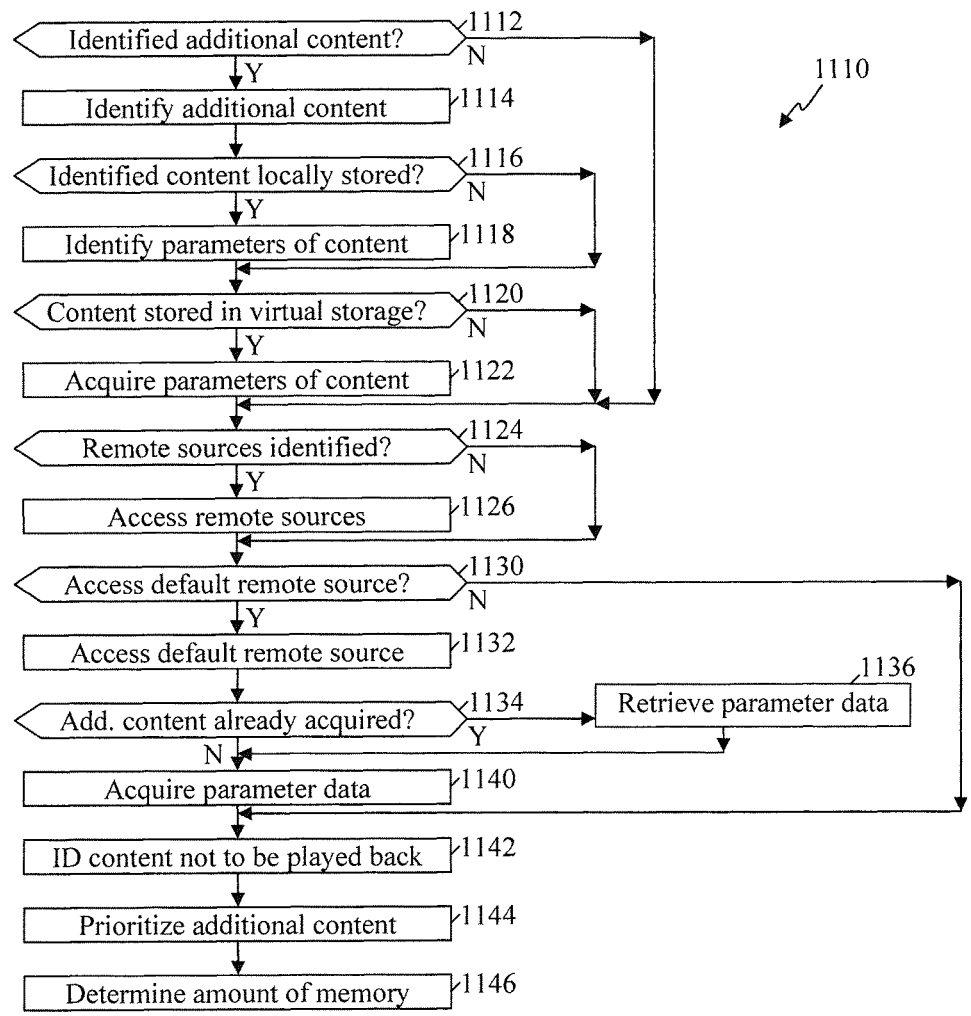
FIG. 11 depicts a simplified flow diagram of a process according to some embodiments for use in identifying additional content not recorded on the portable storage medium that may be played back in association with the portable storage medium.

FIG. 11 depicts a simplified flow diagram of a process 1110 according to some embodiments for use in identifying additional content not recorded on the portable storage medium 116 that may be played back in association with the portable storage medium. In some embodiments, the process additionally determines an amount of local memory 326 desired to implement playback of content in association with the portable storage medium. In step 1112, it is determined whether the portable storage medium 116 identifies one or more additional content not recorded on the portable storage medium to be played back in cooperation with the portable storage medium. In some implementations the portable storage medium 116 may specifically identify one or more additional content that may potentially be played back in association with the portable storage medium. When the portable storage medium 116 does not identify additional content the process advances to step 1124. Alternatively, step 1114 is entered to identify the additional content specified by but not recorded on portable storage medium 116.

In step 1116, it is determined whether the identified additional content is stored in local memory 326 of the playback device 114. The process 1110 advances to step 1120 when at least one of the additional content is not locally stored. When the specified additional content is locally stored step 1118 is entered where one or more parameters of the locally stored additional content identified by the portable storage medium 116 are determined and stored. These parameters can include, but are not limited to, an identifier of the additional content, a memory location, storage size, a priority when known, a date content was acquired, and/or other such information.

In step 1120, it is determine whether the additional content identified by the portable storage medium 116 was previously acquired by the playback device 114 (or by another playback device 216, 220, 221 associated with the virtual storage 112) and added to the virtual storage 112. In some embodiments, the content stored on the virtual storage is known through the log or tracking information and/or file. When content is not in the virtual storage the process advances to step 1124. Alternatively, when the identified content is stored in the virtual storage 112 the process continues to step 1122 where one or more parameters associated with the identified additional content stored on the virtual storage are acquired. Again, the parameters can include, but are not limited to, an identifier of content, storage location within the virtual storage, data size, a version of the content, date previously acquired and/or other such parameters.

In step 1124, it is determined whether one or more remote sources 120, 214 are identified and/or access to one or more sources are identified on the portable storage medium 116 from which additional content may be identified and/or provided to be played back in association portable storage medium. The remote source can be associated with a specific additional content, can be associated with a portion of the portable storage medium 116, can be a general remote source associated with the portable storage medium and/or can be a default source that is associated with numerous different portable storage mediums with different contents recorded thereon. When a remote source is not defined the process advances to step 1130 to determine whether there is a default source identified by the playback device 114.

Alternatively, in step 1126 the identified one or more remote sources are accessed to determine whether additional content is associated with the portable storage medium is available, where to acquire that additional content when it is available and other parameter regarding the additional content, such as whether the content is to be fully downloaded before playback, streamed, progressively downloaded or the like. In some embodiments, an amount of local memory 326 on the playback to be freed up may additionally be identified or a desired amount of local memory 326 to allow a desired playback may be identified. Further parameter may be identified, such as a content identification, data size and/or other such parameters.

In step 1130, it is determined whether one or more default remote sources 120, 214 are to be accessed to determine whether additional content may be acquired that are to be played back in association with the portable storage medium 116. The one or more default remote sources may be specified by the playback device 114, the portable storage medium or another remote source. When it is determined that a default source is not identified or not to be accessed the process advances to step 1142. Alternatively, the process continues to step 1132 to access one or more identified default remote sources and identify additional content, if any, that may be acquired to be played back in association with the portable storage medium 116.

In step 1134, it is determined whether one or more of the additional contents identified by a remote source or a default remote source were already acquired and locally stored on the local memory 326 or on the virtual storage 112. This evaluation can include evaluating the log and/or tracking information as described above and further below, verifying a version of the content to determine whether there are updates and/or newer versions, comparing file parameters (e.g., file size, dates, and the like), and/or other such considerations. In step 1136, local parameter information is obtained for those additional contents that have already been acquired. In step 1140, parameter data for those additional contents to be acquired and not previously acquired are obtained. Again, the parameter data can include one or more of a content identifier, local storage location (for content stored in the local memory 326), storage location on the virtual storage 112 (for content stored on the virtual storage), source access information (for remote sources 120, 214 and/or virtual storage 112), memory location, access rights, storage size, priority information, and/or other such parameters.

In step 1142, additional content that is associated with the portable storage medium 116 and that was previously obtained (whether stored on local memory 326 or on the virtual storage 112), and that are not to be played back in association with the portable storage medium are identified. The previously obtained content may not be played back because, for example, a newer version of the additional content may be available; a content owner may desire to replace the content with newer, more relevant content and/or different content; and/or other such factors.

In step 1144, the additional content available to be played back in cooperation with the portable storage medium 116 are prioritize with regards to utilizing local storage 326 of the playback device 114 and/or played back. In step 1146, an amount of local memory 326 desired to effect playback of content in association with the portable storage medium 116 is determined. Again, this can take into account one or more factors, such as, whether additional content is to be completely downloaded before playback begins, whether additional content is to be streamed or progressively downloaded or otherwise provided while playback of the content is ongoing, capabilities of the playback device 114, desired content playback window size relative to seeking, bandwidth factors, and/or other such factors.

Figure 12:
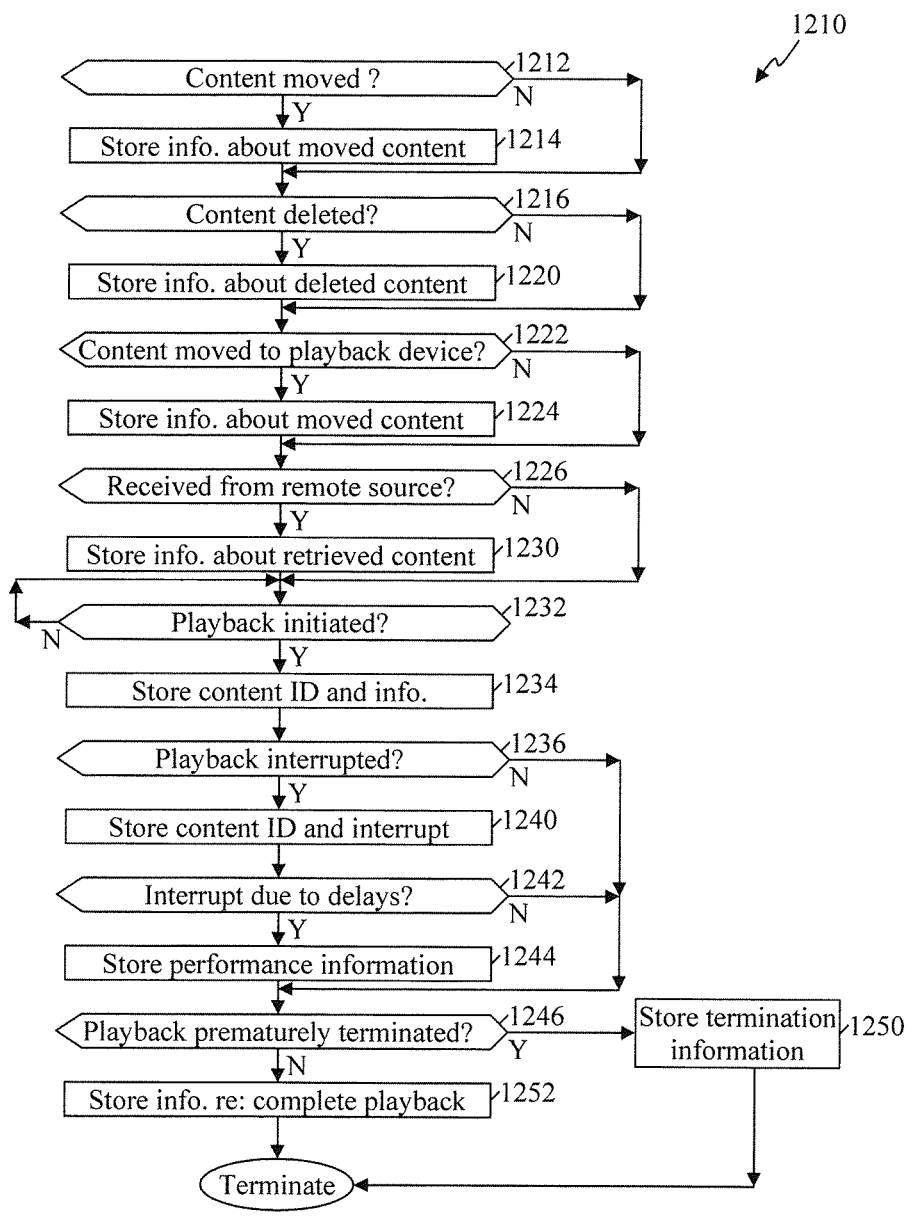
FIG. 12 depicts a simplified flow diagram of a process, according to some embodiments, to track content changes to a local memory of a playback device and/or a virtual storage, and in some instances access to content on the playback device, the virtual storage and/or one or more remote sources.

FIG. 12 depicts a simplified flow diagram of a process 1210, according to some embodiments, to track content changes to the local memory 326 of the playback device 114 and/or the virtual storage 112, and in some instances access to content on the playback device 114, the virtual storage 112 and/or one or more remote sources 120, 214. In step 1212 it is determined whether one or more content store in local memory 326 on the playback device 114 has been moved to virtual storage 112, for example, since a last evaluation or in response to a notification or trigger of the movement or deletion of the content. When content has not been moved to virtual storage since a last evaluation the process advances to step 1216 to determine whether content was deleted. Alternatively, in step 1214 an identification of the content for each content moved to virtual storage is stored in a log or tracking file or database. In some embodiments additional parameters are further stored, such as but not limited to a memory size of the moved content, a location within virtual storage 112 where content is stored (e.g., an identification of a device 120, 214, 216, 220, 221 on the virtual storage and a memory location within the device; virtual storage location that is mapped at the server managing the virtual storage; access to a remote source from where the content was retrieved (e.g., a network address, URI, URL and/or other such information), or other such memory location), date and/or time content was moved, an identification of a playback device 114 that moved the content to virtual storage, a number of times the content was previously retrieved from virtual storage and/or was moved to virtual storage, duration content was stored locally on playback device, number of times the content was played back, and other such information.

In step 1216 it is determine whether content is or has been deleted from local memory 326 of the playback device 114 while the deleted content is not moved to the virtual storage. When content has been deleted from local storage step 1220 is entered where an identification of the deleted content is stored in the log or tracking file or database. Other parameters may additional be stored, such as but not limited to a memory size of the content; date deleted; duration content was stored locally on playback device; original remote source 120, 214, 216, 220, 221 from which the content was retrieved; access to the original source (e.g., a network address, URI, URL and/or other such information) and other such parameters including those introduced above. In step 1222 it is determined whether content is moved from the virtual storage 112 to the playback device 114 to be stored locally on the playback device. The process advances to step 1226 when content has not been moved from virtual storage.

Alternatively, step 1224 is entered to store an identification of the content and a local memory location where the content was locally stored. Other information and parameters may additionally be stored such as those identified above.

In step 1226 it is determined whether content is received from a remote source that is not part of the virtual storage 112. When content is not received the process continues to step 1232. Step 1230 is entered when content is retrieved from a remote source that is not part of the virtual storage 112 and an identification of the content and a local storage location are obtained and logged. Again, additional information and parameters may be stored, such as but not limited to an indication that content was retrieved from a source outside the virtual storage 112, an identification of the remote source; access to the source (e.g., URL); authorization to access and/or acquire the content; estimate of the longevity of the source (whether it is anticipated that the source can readily be accessed at a later time to acquire the same content); an alternative source (which may be specified by the remote source or the device and/or the instruction to access the remote source); a portable storage medium with which the received content is to be associated with and played back in cooperation with; a memory size of the content; date/time stored; and/or other such information, such as those described above.

In step 1232, it is determined whether playback of a content is initiated. When playback is not initiated the process waits at step 1232 until playback begins. Once playback is initiated, the process continues to step 1234 to store an identification of the content and an indication that playback of the content was initiated. Other information and parameters may additionally be tracked and stored, such as but not limited to an identification of the portable storage medium with which the additional content is being played back; a date/time played back; a number of times the content has been played back; a number of times the content has been played back in association with the portable storage medium being currently accessed by the playback device; and other such information.

Some embodiments may additionally track playback statistics and other information associated with the playback of additional content. This information can be utilized to aid in selecting content to retrieve from virtual storage 112 and/or to acquire from a remote source 120. Similarly, this tracked information can additionally be provided to content owners and/or distributers. For example, in some embodiments, the process 1210 can continue to step 1236 to determine whether the playback of additional content and/or content from the portable storage medium 116 was interrupted during playback. The process advances to step 1246 when an interruption was not detected. When an interruption was detected step 1240 can be entered to further store, log and/or track an identification of the content that was interrupted and a location within the content where the interruption occurred, an identification of the portable storage medium associated with the playback may additionally stored, and other such information as described above.

In step 1242, the process can further determine whether the interruption was a result in delays in obtaining the content from the remote source 120 and/or virtual storage 112 (e.g., bandwidth insufficient to supply content at sufficient rate to provide uninterrupted playback; playback device did not have the capability to retrieve content at rate attempting to be delivered; and/or other such factors). When an interruption was a result of a result of a delay step 1244 is entered to store a indication that interruption was a result of performance, and may additionally store other information and/or parameters, such as an identification of the remote source 120, a version or stream of the content being obtained, a playback quality of the content being played back (e.g., whether the content is encoded as a standard playback quality versus high definition quality), a bandwidth of the connection with the remote source and/or virtual storage, and other identified parameters and/or problem when the problem can be identified.

In step 1246, it is determined whether playback of the content was prematurely terminated. When a premature termination is detected step 1250 can be entered to store a location within the content where termination occurred, and in some instances information about the termination, such as reasoning for termination (e.g., user instruction; disc instruction; server instruction; and the like), an identification of the portable storage medium 116 associated with the prematurely terminated content and other such information as described above. The process 1210 can advance to step 1252 when a premature termination of playback is not detected to store information that the content was completely played back and/or increment a number of times the content was completely played back. Again, other information may additionally be stored and tracked, such as the identification of the portable storage medium 116 associated with the playback and other such information and/or parameters such as those described above. Additionally, some or all of the tracked information can be provided to one or more remote servers 120, sources of content and/or other entities, such as a remote server managing the virtual storage 112. Further, in some embodiments, some or all of the steps of the process 1210 may be performed by devices other than the playback device 114, such as a remote source 120 managing the virtual storage 112.

Figure 13:
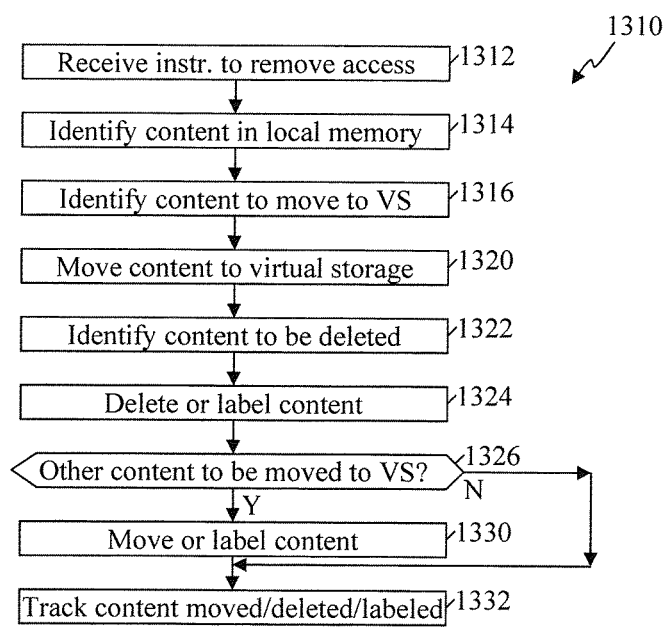
FIG. 13 depicts a simplified flow diagram of a process of managing a local memory and/or a virtual storage in response to a portable storage medium being ejected from the playback device or otherwise removing a playback device's access to the portable storage medium.

Some embodiments further manage the local storage 326 and/or the virtual storage 112 in response to completing playback with respect to a portable storage medium 116, and/or in response to a playback device's loss of access to a portable storage, such as when the portable storage medium 116 is ejected or otherwise removed from the playback device 114. FIG. 13 depicts a simplified flow diagram of a process 1310 of managing the local memory 326 and/or the virtual storage in response to a portable storage medium 116 being ejected from the playback device 114 or otherwise removing a playback device's access to the portable storage medium. In some embodiments, the process 1310 can be implemented in response to receiving instructions to terminate access to the portable storage medium 116 and/or in response to losing access to the portable storage medium. As such, some or all of the process 1310 may, in some instances, be implemented after the playback device's access to the portable storage medium has been terminated.

In step 1312, an instruction to eject the portable storage medium or discontinue access to the portable storage medium is detected. In step 1314, content that is stored in the local memory 326 and associated with the portable storage medium are identified. In step 1316, the content identified as being associated with the portable storage medium are further evaluated to identify content that can be moved to the virtual storage 112. This content may include, but is not limited to, status information regarding the playback of content; current scores in a game; status information regarding a game; additional content; content previously acquired from virtual storage; content acquired from a remote source 120; or other such information or combinations of such information).

In step 1320, the identified content associated with the portable storage medium are transferred or moved to the virtual storage, or in some embodiments identified or labeled to be moved upon access to a subsequent portable storage medium or other content to be played back through the playback device. For example, the identified content may not be removed from the local memory 326 because the same content may again be utilized with a subsequently accessed portable storage medium. As a specific example, the same portable storage medium that was just ejected from the playback device may be the subsequently accessed portable storage medium.

In step 1322, the content stored on the local memory 326 is further evaluated to identify content that can be deleted. This can include content that is associated with the portable storage medium, which can include content that has been copied to virtual storage 112, as well as other content. In step 1324, the content identified that can be deleted is delete from the local memory 326, or in some instances identified or labeled to be deleted in response to the playback device 114 accessing a subsequent portable storage medium or other content to be played back through the playback device.

Some embodiments may additionally include step 1326 to determine whether there is other content stored on the local memory 326 that can be moved to virtual storage 112. Again, this can include evaluating certificates, authorizations, relationships to content owners, frequency of use, user defined parameters and/or priorities, and other such information. When there are one or more further contents to be moved step 1330 is entered where the one or more contents are moved or otherwise labeled to be moved. In step 1332, the movement and/or deletion of content is tracked or logged, and in some instances notifications of some or all of the movements and/or deletions are forwarded to a remote sever 120.

As described above, the playback device 114 cooperates with one or more remote sources 120, 214, 220 to acquire additional content. Further, in some embodiments, the playback device 114 cooperates with one or more remote sources 120, 214, 220 to manage the virtual storage. Alternatively or additionally, some embodiments employ a remote server 120 and/or computer 220 to control and manage the virtual storage.

Figure 14:
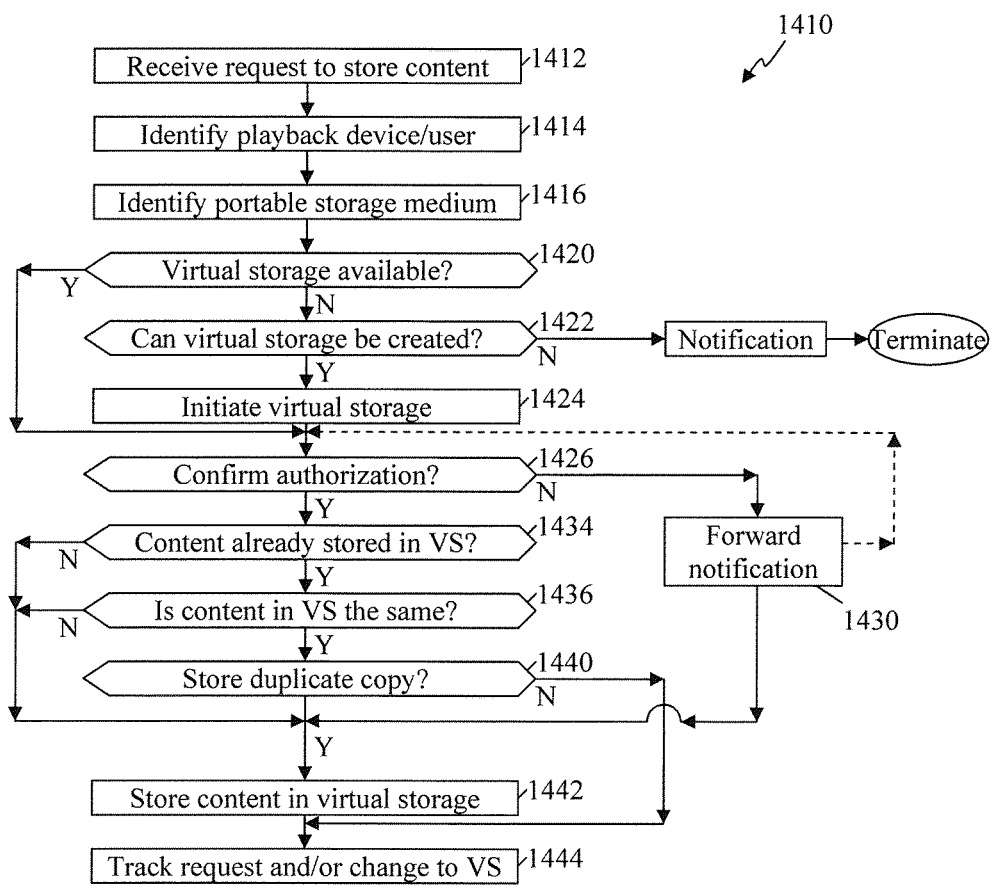
FIG. 14 depicts a simplified flow diagram of a process implemented by a server or other such remote device to store content to a virtual storage in accordance with some embodiments.

FIG. 14 depicts a simplified flow diagram of a process 1410 implemented by a server 120 or other such device to store content to the virtual storage 112 in accordance with some embodiments. In step 1412, a request is received at the server 120 that content be stored to the virtual storage 112. In step 1414, the playback device 114 requesting that content be stored in virtual storage is identified. This identification can be based on substantially any relevant identification, such as but not limited to a serial number, a network address, a unique identification number (e.g., supplied to the playback device upon establishing a virtual storage to be associated with the playback device), received in response to a query, a log-in (e.g., a user log-in), or other information or combinations of such information. In some embodiments, a user is additionally or alternatively identified. The identification of a user may be based on a user profile, a log-in, a password, a response by a user to a request from the server, or other such information or combinations of such information. In step 1416, the portable storage medium 116 and/or content recorded on the portable storage medium accessed by the playback device 114 is identified.

In step 1420 it is determined whether a virtual storage 112 is established for and associated with the identified user and/or playback device 114. When virtual storage is identified that is associated with the requesting user and/or playback device the process may advance to optional step 1426 to confirm authorization to move content to virtual storage. When virtual storage is not established for a requesting entity step 1422 is entered to determine whether virtual storage should be created or allocated for the requesting entity (e.g., user and/or playback device 114). When a virtual storage is not to be created the process 1410 terminates, and in some instances issues a notification that there was not a virtual storage, that the requested content could not be stored and/or may provide reasons why a virtual storage could not be established. Alternatively, when a virtual storage can be created and/or activated the process continues to step 1424 to initiate a virtual storage associated with the requesting entity, such as the user and/or the playback device 114.

In step 1426, authorization to store the content requesting to be stored in the virtual storage is confirmed. In some instances, the content attempting to be moved to virtual storage can have restrictions, there may be restrictions on the virtual storage 112 that may limit storing content and other such restrictions. For example, restrictions on the content may be specified by a content owner, distributor or other entity (e.g., a movie studio may restrict the movement of the content to a virtual storage, or limit the movement to virtual storage only after protection of the content is confirmed on the virtual storage and/or protections are applied to the content attempting to be moved to virtual storage). Similarly, a user's account providing the user and/or playback device 114 with access to a virtual storage 112 may limit the amount of content that can be stored, may limit the type of content that can be stored and other such limits. In some instances, when authorization cannot be obtained and/or restrictions apply that may limit the content from being moved to virtual storage the process can advance to step 1430 to notify the playback device 114, and typically a user through the playback device. Information about why the content cannot be moved may also be provided. For example, the server 120 may notify the user that her/his account is insufficient and that upgrades can be obtained, that the user's virtual storage is full, that the content is not authorized to be moved to virtual storage or other such factors. The process can then advance to 1442 to log or track the attempt to move the content to the virtual storage 112, and in some instances may return to 1426 when, for example, a user is able to address the authorization issues and/or overcome one or more of the restrictions.

Step 1434 is entered following step 1426, when authorization to store content to the virtual storage 112 is confirmed and/or not needed, to determine whether the content attempting to be moved to the virtual storage is already stored in the virtual storage. In some instances a playback device 114 may not have knowledge of all the content that is on the virtual storage. For example, the playback device 114 may be a relatively simple playback device with limited functionalities and/or minimal local storage 326. Further, in some embodiments, the virtual storage 112 extends to multiple playback devices 216, 220, 221 that may also locally store content, and as such, the requesting playback device 114 may be unaware of some or all the content stored to virtual storage 112 by other playback devices and/or content stored on one or more additional playback devices within the virtual storage 112.

When it is determined in step 1434 that the content is not already stored the process advances to step 1442. Alternatively, step 1436 is entered to determine whether content stored in virtual storage 112 is the same content as that requesting to be stored. This can include, for example, verifying that the content attempting to be recorded is the same version, has the same run length, same data size, and/or other factors. As another example, the process may determine whether content requesting to be stored is an update to content already recorded to the virtual storage 112. When it is determined in step 1436 that the content requesting to be stored in the virtual storage 112 is already stored some embodiments advance to step 1440 to determine whether a duplicate copy should be recorded to the virtual storage 112. For example, some embodiments further take into consideration where the other copy of the content recorded on the virtual storage 112 is stored. Again, the virtual storage 112 can, in some embodiments, extend the memory on other playback devices 216, 220, 221. As such, in determining whether a copy of the content requesting to be moved to virtual storage 112 is already stored on the virtual storage can consider whether the version of content already stored on the virtual storage is stored on a portable playback device (e.g., playback device 221) that may at times be removed from the virtual storage resulting in the content at least temporarily being unavailable to the playback device 114. Further, when other playback devices are part of the virtual storage 112 the access and/or authorization to move the content from one playback device to another playback device can also be taken into account when determining whether to move the content requested to be stored into the virtual storage 112 even when such movement would result in a duplicate copy on the virtual storage.

When it is determine in step 1436 that the content is verified as the same and thus already stored in virtual storage 112 (and in some instances readily available over the virtual storage) and a duplicate is not to be stored as determined in step 1440 the process advances to step 1444. When the content is not the same and/or a duplicate copy is to be stored on the virtual storage 112, the process continues to step 1442 where the content requested to be moved to virtual storage 112 is store on the virtual storage. The storage of the content to the virtual storage 112 can, in some embodiments, including storing authorizations and access information to the content (e.g., studio affiliations, passwords, certificates and/or other such authorizations and access). Additional information may also be stored, such as an association with the content and/or portable storage medium 116, associating the stored content with a user (e.g., user account or profile) and/or playback device (e.g., playback device profile), and other such information and/or associations. Further, some embodiments may evaluate previously stored content on the virtual storage to determine whether to delete content from the virtual storage. For example, when it is determined that the content requesting to be stored is an updated version of content on the virtual storage or intended to be used in place of content on the virtual storage, the other content may be deleted. In step 1444 the request that the content be stored on the virtual storage and/or the storing of the content to the virtual storage 112 is logged and/or tracked.

Figure 15:
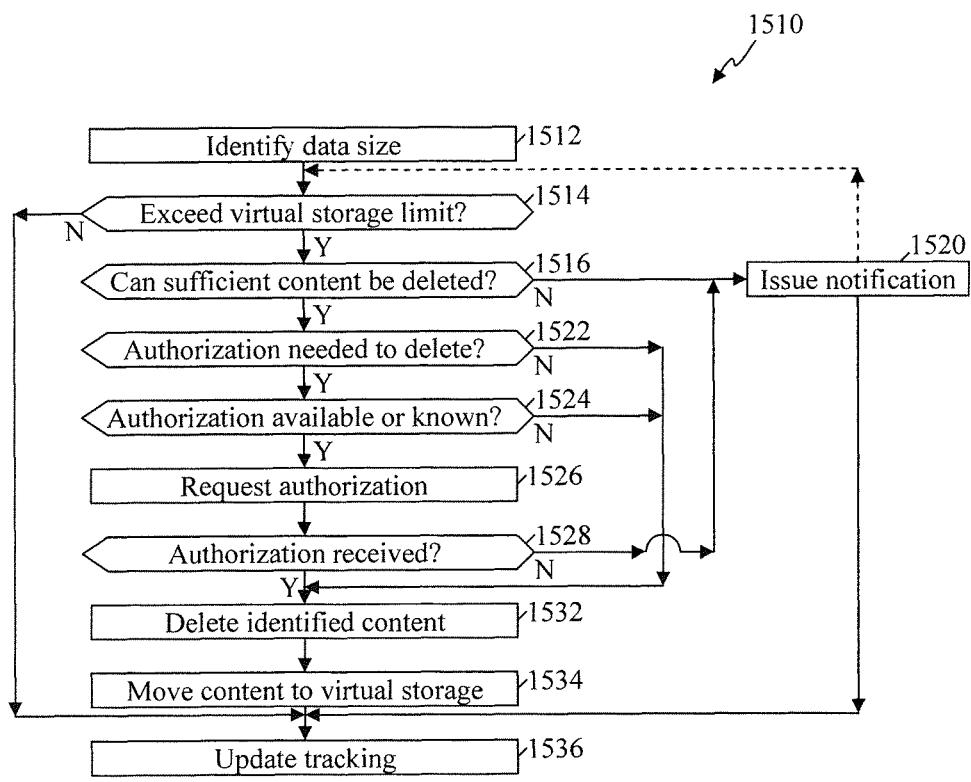
FIG. 15 depicts a simplified flow diagram of a process, according to some embodiments, for storing content onto a virtual storage when the virtual storage has a limited data size and/or storage capacity.

FIG. 15 depicts a simplified flow diagram of a process 1510, according to some embodiments, for storing content onto the virtual storage 112 when the virtual storage has a limited data size and/or storage capacity. It is noted that in some embodiments the amount of memory available in the virtual storage 112 may have limits. As such, the virtual storage 112 is further managed regarding the content to store, retain, move and/or delete. The process 1510 can, in some implementations, be utilized in cooperation with the process 1410 of FIG. 14. In step 1512, a data size of the content requested to be moved to the virtual storage 112 is identified. In step 1514, it is determined whether the content requesting to be moved will exceed a virtual storage limit. Some embodiments may restrict an amount of data storage there is available through the virtual storage 112. In these embodiments step 1514 can be implemented to address requests to store content that would result in exceeding the data storage available through the virtual storage. When it is determined that the content would not exceed the storage limits of the virtual storage 112 the process advances to step 1536 to store the content in the virtual storage 112.

Alternatively, when the content requesting to be stored would exceed the available storage of the virtual storage 112 the process continues to step 1516 to determine whether a sufficient amount of content stored in the virtual storage 112 can be deleted from virtual storage to free up memory space in the virtual storage to allow the content to be stored. One or more factors can be taken into account in investigating whether memory can be freed up within the virtual storage 112. In some embodiments, the evaluations performed to free up memory within the virtual storage can be similar to those described above with respect to the processes 910 and 1010 of FIGS. 9 and 10. For example, one or more certificates, credentials or other authorizations can be identified and content can be identified on the virtual storage 112 that are associated with the identified certificates, credentials or other authorizations. Further, the content on the virtual storage 112 can be prioritized with regards to content being deleted from the virtual storage. The prioritization again can be similar to the prioritization described above regarding moving or deleting content from the local storage 326 of the playback device 114, and can consider one or more factors or parameters. These parameters can include, but are not limited to expirations of content, predefined or designated to be deleted, content designated as not to be deleted, predefined priority levels, whether content is intended to be played back with the portable storage medium 116 currently being accessed by a playback device 114, whether content can be re-obtained, a frequency of use, date content was obtained by a playback device and/or moved to virtual storage, date content was last played back or utilized, whether there are any updated versions of the content and/or instructions to override content, data size, image and/or playback quality (for example, in relation to content on the portable storage medium), anticipated use (e.g., based on user profile, genre, performers, actors, directors and the like), and other such factors. Further, the prioritization can take into consideration where and/or on what device of the virtual storage 112 the content is stored and prioritize relative to that device. Additionally, the prioritization can take into account other playback devices 216, 220, 221 that may have access to the virtual storage 112 and/or portable storage mediums 116 accessed or actively accessed by these one or more other playback devices.

When it is determined in step 1516 that a sufficient amount of virtual storage 112 cannot be freed-up the process advances to step 1520 to issue a notification to the playback device 114 and/or user. Tracking may be implemented at step 1536 in some embodiments following the notification. Additionally and/or alternatively, some embodiments may allow a user to actively go in and delete content from the virtual storage 112 without authorization and/or without concern for certificates, credentials or the like. As such, the process may return to step 1514 to determine whether sufficient storage is available, for example, in response to receiving confirmation from a user that content had been freed up or that content has been designated to be deleted.

Step 1522 is entered when a sufficient amount of storage can be freed-up to determine whether authorization is needed to delete one or more of the contents identified. When authorization is needed step 1524 is entered to determine whether authorization is available or known. This information can be based on one or more certificates, credentials or other authorizations recorded on the portable storage and/or received from a content supplier, distributed and/or owner. When authorization is not already available, step 1526 is entered where a notification and/or a request for authorization is issued. In step 1528 it is determined whether the authorization was received. When authorization was not received the process continues to step 1520 to issue a notification. Some embodiments may optionally attempt to reprioritize and again determine whether determine whether sufficient content can be deleted based on the reprioritized content.

Alternatively, when it is determined in step 1522 that authorization is not needed, determined in step 1524 that authorization is available or determined that authorization was received in step 1528, the process continues to step 1532 where identified content is delete. Again, the content is deleted based, at least in part, on the prioritization and, in some instances, receiving the authorization. In step 1534, the content attempting to be moved to the virtual storage 112 is moved to the virtual storage. In step 1536, the deletion of content and/or the moving of the requested content to the virtual storage is tracked and/or logged, for example a tracking table or database of the virtual storage 112 is updated regarding the one or more contents deleted, the update to the virtual storage and/or the request to update virtual storage 112.

The updating of the tracking can, in some embodiments, further include updating parameters and/or metadata for the content moved to virtual storage 112. These updates can include, but are not limited to, one or more of incorporating an association between the content moved to the virtual storage 112 and the portable storage medium 116 with which the content is intended to be played back; a number of times the content has been moved to virtual storage 112 (e.g., if content was previously recorded but previously deleted, moved back to playback device, whether content was previously recorded to virtual storage and the like); date and/or time content was moved to the virtual storage; date and/or time content was obtained by a playback device 114; and other such parameters and/or metadata. In some embodiments, these updates to the tracking may further be supplied to one or more playback devices 114, 216, 220, 221 providing the playback devices with consistent and updated tracking information.

Figure 16:
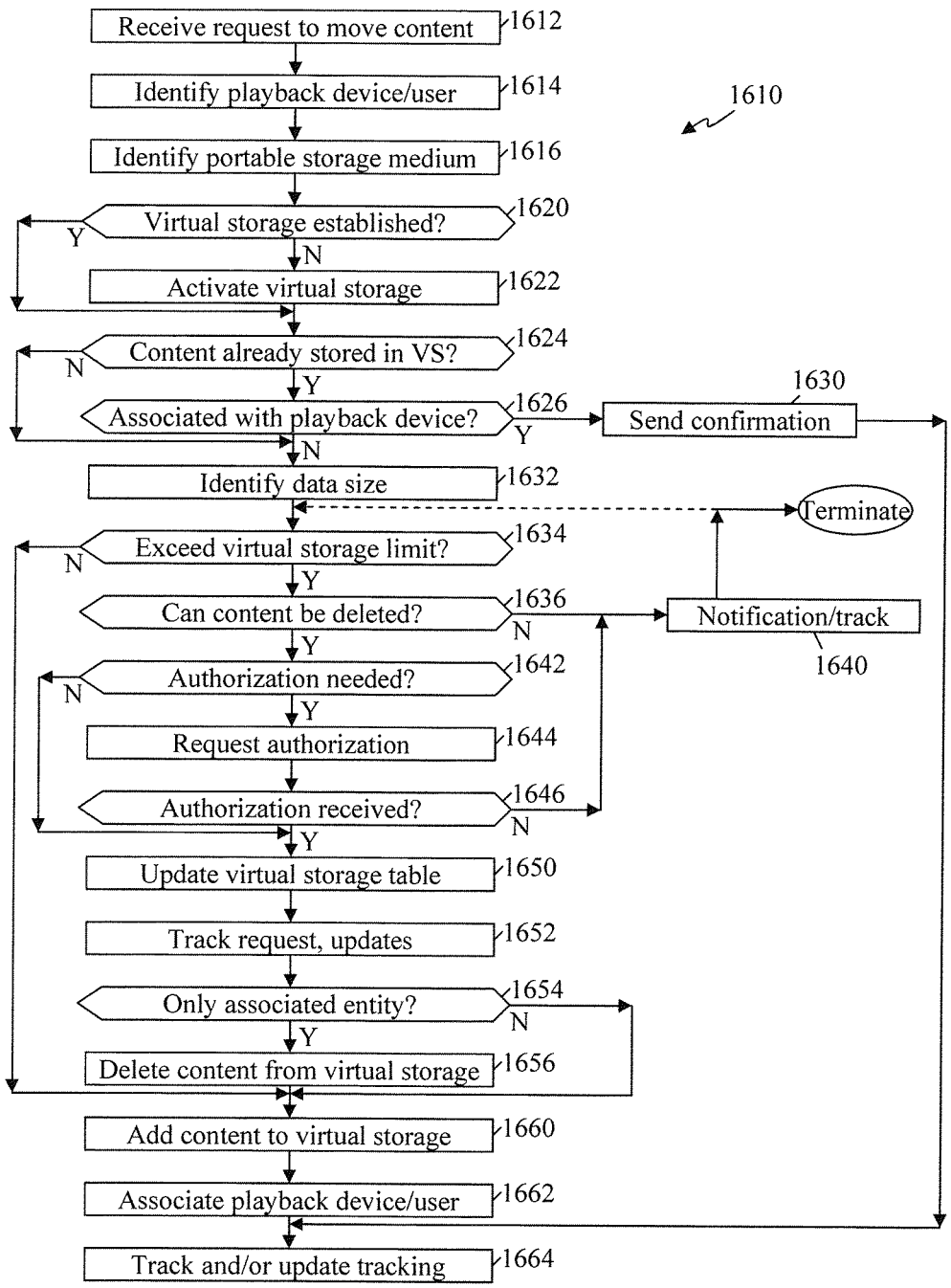
FIG. 16 depicts a simplified flow of a process of managing content on a virtual storage.

FIG. 16 depicts a simplified flow of a process 1610 of managing content on a virtual storage 112, including storing content to the virtual storage. As described above, some embodiments employ a virtual storage that is a database of content that is accessed by a plurality of different users and/or different and unassociated playback devices. As such, the virtual storage 112 maintains content for a plurality of different playback devices and/or users, and maintains a virtual storage table or listing for each user and/or playback device that associates one or more contents stored in the virtual storage 112 with the user and/or playback device. In this configuration, a single stored content on the virtual storage 112 can be accessed and/or utilized by multiple different and unrelated users and/or playback devices 114.

In step 1612 a request is received to move content from a playback device 114 to the virtual storage 112. In step 1614, the playback device 114 and/or user requesting that content be moved to the virtual storage 112 is identified. Again, the identification can be based on one or more of a serial number, a unique identification number, a user account, a user provide and/or other such information. Some embodiments further include step 1616 where a portable storage medium 116 associated with request is identified. Further, in some embodiments, one or more certificates, credentials or other authorizations recorded on the portable storage medium 116 being accessed by the playback device 114 at the time the request is issued to store the content to the virtual storage is also obtained (or identification of such certificates, credentials or other authorizations are obtained) and stored in the virtual storage and/or in a virtual storage table.

In step 1620 it is determined whether virtual storage is established and/or active for the requesting playback device and/or user. When the virtual storage is not active step 1622 is entered to activate the virtual storage. In step 1624 the virtual storage is evaluated to determine whether the content requested to be moved or added to the virtual storage is already stored in virtual storage 112. As described above, this can include confirming that the content stored in the virtual storage is the same content attempting to be stored (e.g., confirming versions, run lengths, data size and/or other such information). Further, this can determine whether updated or override content are already stored on the virtual storage and intended to be or can be used in place of the content requesting to be incorporated to the virtual storage. When the content is not already stored the process advances to step 1632.

When the content is already stored in the virtual storage, or an updated content or override content is stored on the virtual storage, step 1626 is entered to determine whether a virtual storage table corresponding to the requesting playback device 114 and/or user associates the content requesting to be added to the virtual storage with the requesting user and/or playback device. When the virtual storage table already associates the content with the requesting playback device and/or user the process may continue to step 1630 where a confirmation is sent to the requesting playback device confirming that the content is stored on the virtual storage 112. The process 1610, in some embodiments, then advances to step 1664 to log and/or track the request to add the content to the virtual storage.

Alternatively, when it is determined in step 1626 that the virtual storage table does not associate the content with the requesting playback device and/or user step 1632 may be entered to identify a data size of the content requesting to be stored in the virtual storage. In step 1634 it is determine whether the requested content will exceed a virtual storage limit set for the requesting playback device and/or user. In some embodiments, the virtual storage 112 may apply limits on an amount of data storage that can be utilized and/or associated with a playback device 114 and/or user or user account. For example, different amounts of storage within the virtual storage may be available depending on a service package or account level, and each user or playback device can be allocated a predefined amount based on an associated service pack or account level. As such, when it is determined that the content would not exceed a virtual storage limit the process advances to step 1660 to record and/or associated in virtual storage table the content requesting to be stored with the requesting playback device 114 and/or user.

When the virtual storage limit would be exceeded in storing and/or associating the requested content with the requesting playback device or user, the process can continue to step 1636 to determine whether a sufficient amount of content can be virtually deleted and the association with the playback device and/or user removed to effectively free up memory space in virtual storage 112 that can be associated with the requesting playback device and/or user to allow the association of the requested content with the requesting playback device and/or user. Again, the selection of which content to virtually delete, and thus remove the association in the virtual content table, can be based on a prioritization of the associated contents. The prioritizing can be similar to the prioritizing described above. When sufficient amounts of content cannot be virtually deleted and thus disassociated, a notification can be forwarded in step 1640, the request tracked or logged, and the process terminates, or returns to step 1634 in response to receiving instructions that the user or other entity at least virtually deleted content or designated content to be virtually deleted that previously was not authorized to be virtually deleted.

When content can be unassociated in the virtual storage table and effectively virtually deleted the process continues to step 1642 to determine whether authorization is needed to disassociate one or more of the identified contents. The process advances to step 1650 when authorization is not needed. Alternatively, step 1644 is entered to issue a notification and/or request for the authorization. In step 1646 it is determined whether authorization is received. When authorization is not received the process terminates and in some instances advances to step 1640 to issue a notification of termination.

In step 1650 the virtual storage table is updated to disassociate content from the requesting playback device and/or user to effectively virtually delete content from the virtual storage associated with the playback device and/or user. In step 1652 a tracking table, listing or the like that tracks interactions of the user and/or playback device and the virtual storage 112 can be updated regarding the disassociation of content. Some embodiments may further include step 1654 where it is determined whether the requesting playback device and/or user is the only playback device and/or user that was associated with the content that was virtually deleted. In those instances where no other playback devices and/or users are associated with the content the process enters step 1656 where the unassociated content is delete from the virtual storage 112.

In step 1660 content requested to be added to the virtual storage, or an updated content or override content when relevant, is added to the virtual storage 112 when it is determined in step 1624 that the content was not otherwise stored on the virtual storage. In step 1662 the content requested to be added to the virtual storage, or an updated content or override content when relevant, is associated in virtual storage table with the requesting playback device and/or user. Further in some embodiments, the content can be associated with one or more certificates, credentials or other authorizations recorded on the portable storage medium 116, which can later be used, in some instances, when a request to retrieve the content is received. In step 1664 the tracking table for the requesting playback device and/or user is updated regarding the update to virtual storage 112. The update to the tracking table can include associating the content with the portable storage medium 116, identifying a number of times the content has been recorded to virtual storage, date and time can be track and other such factors as described above and further below.

Figure 17:
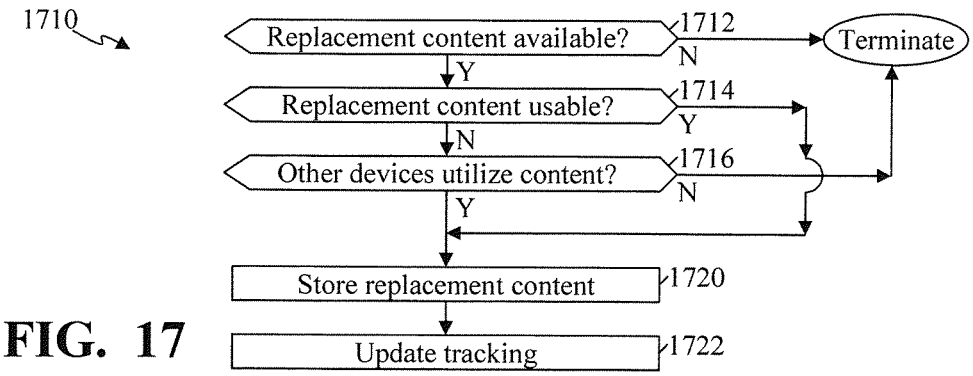
FIG. 17 depicts a simplified flow diagram of a process that may be implemented, in some embodiments, when adding content to the virtual storage.

FIG. 17 depicts a simplified flow diagram of a process 1710 that may be implemented, in some embodiments, when adding content to the virtual storage 112. For example, the process 1710 may be implemented as part of or in cooperation with step 1440 of the process 1410 of FIG. 14 in storing content to the virtual storage and/or part of step 1624 and/or step 1662 in the process 1610 of FIG. 16. In other embodiments, the process 1710 may be implemented after content is stored to the virtual storage 112 or implemented as a separate process from the storing of content to the virtual storage, for example, as a maintenance of the virtual storage. In step 1712, it is determined whether a replacement content is available to be acquired in place of the content attempting to be moved to the virtual storage 112 (or stored in the virtual storage when performing maintenance of the virtual storage). The replacement content can be a newer, updated or revised version of the content attempting to be moved to the virtual storage, or may be different or alternate content that overrides the content attempting to be stored in the virtual storage. This determination can include contacting a remote source 120 to inquire whether an updated version of the content is available to be used in place of the identified content. Additionally or alternatively, the server 120 managing the virtual storage 112 may receive updates or updated information from one or more content sources and/or content owners, such a movie studio, record label, content distributor or other such content source. Again, the updated content and/or the override content allows more relevant and/or current content to be utilized in the playback of content associated with the portable storage medium 116 being accessed at a playback device 114. When a replacement content is not known or not available the process terminates.

When a replacement content is available step 1714 is entered to determine whether the replacement content can be utilized with the playback device 114 attempting to move the content to the virtual storage, or can be utilized by one or more playback devices associated with the content stored in the virtual storage 112 being evaluated. In some instances a playback device 114 may have limited capabilities. As such, the replacement content may not be effectively played back by the playback device 114. As a specific example, the playback device may not be able to playback high definition video content and thus may be incompatible with a replacement content that is a high definition content. When playback device can play back the updated or replacement content the process advances to step 1720 where the content attempting to be moved to the virtual storage 112 is replaced by the updated or replacement content (or the content being evaluated is replaced by the updated or replacement content).

When the replacement content cannot be utilized by the playback device some embodiments may include step 1716 where it is determined whether one or more other playback devices 216, 220, 221 are associated with the currently accessed virtual storage 112 and whether at least one of the one or more other playback devices can utilize the updated or replacement content. When one or more other playback devices may be able to utilize the update or replacement content the process continues to step 1720 to designate that the replacement content is to be stored in addition to the version of the content requested to be moved to the virtual storage 112. The storing of the replacement content may include determining whether there is memory space available in the virtual storage 112 as described above.

Alternatively, when it is determined in step 1714 that the playback device 114 cannot utilize the updated or revised content and/or when it is determined in step 1716 that one or more other devices are not available or cannot utilize the updated or replacement content, the process terminates. Further evaluations may be implemented, in some instances, such as confirming that the content and/or replacement content is not already stored on the virtual storage 112; however, this may be implemented by another process, such as process 1410. Some embodiment, may include optional step 1722 where the replacement or storage of content attempting to be moved to the virtual storage along with the replacement version can be tracked and/or logged, which can include associating the content and/or replacement content with the corresponding one or more playback devices, the portable storage medium 116 being accessed by the playback device 114, a user and other such tracking as described above and further below.

In some embodiments, the process 1710 may be implemented as an update to the virtual storage 112. For example, a content source, such as a movie studio, may notify the server 120 managing the virtual storage that updated content and/or override content is available. The server 120 can then determine whether the updated and/or override content are relevant to content already stored on the virtual storage 112. In those instances where one or more of the updates or overrides are relevant the process can evaluate the potential replacement content in relation to the virtual storage 112 and the one or more playback devices that can access the virtual storage.

Figure 18:
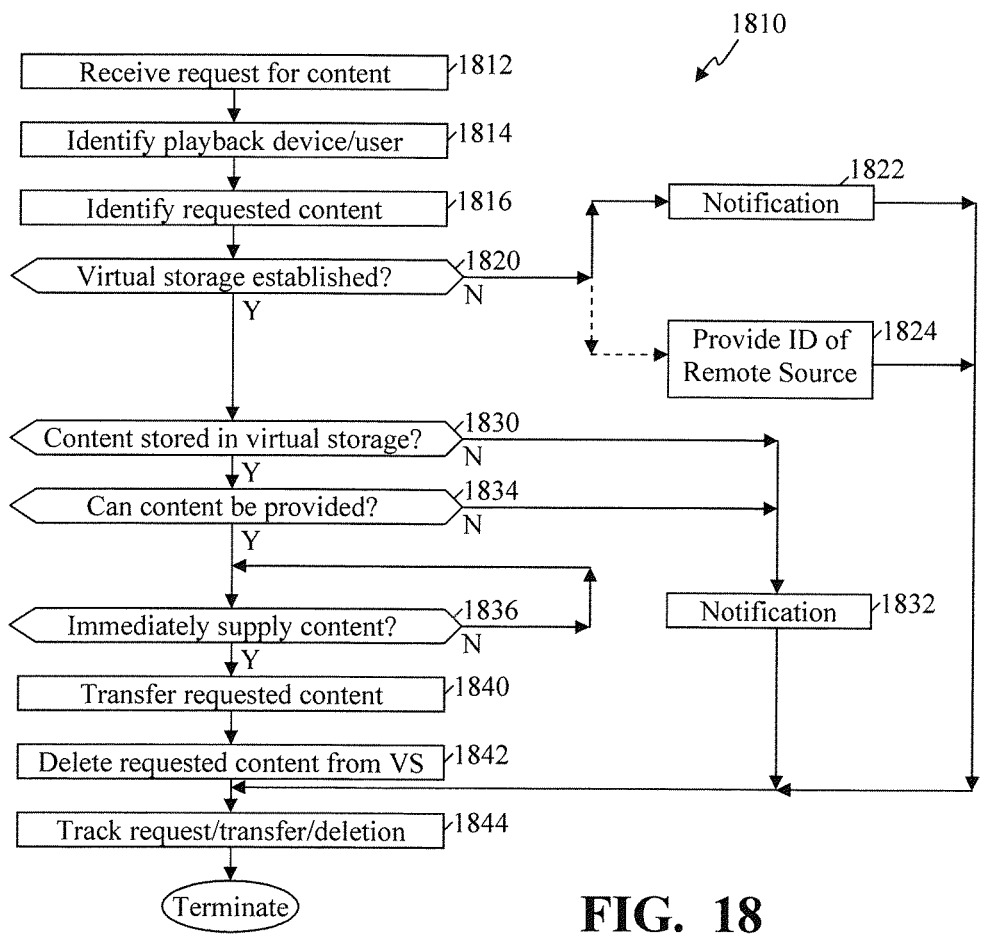
FIG. 18 depicts a simplified flow diagram of a process of supplying content from a virtual storage to a playback device.

FIG. 18 depicts a simplified flow diagram of a process 1810 of supplying content from a virtual storage 112 to a playback device 114. In step 1812 a request is received from a playback device 114 for content from the virtual storage 112. In step 1814 the playback device and/or a user requesting the content is identified. The identification can be based on substantially any relevant information, such as a playback device serial number, a user name, a user profile, and other such information or combinations of such information. In step 1816, the request is further evaluated to identify the content being requested and/or to be provided in response to the request. This identification can be based on a specific identifier of the content being requested, based on an identification of the portable storage medium 116 being accessed at the playback device 114, an identification of content on the portable storage medium 116 being accessed at the playback device, a title of the content requested, an identification of the playback device (e.g., identify virtual storage of playback device), based on a user identification, or other such information or combinations of such information.

In step 1820 it is determined whether virtual storage is established for and associated with the identified requestor. When virtual storage is not established for a requesting playback device or user, a notification may be issued in some instances in step 1822 that the content was not available and/or that a virtual storage was not established, and the process can continue to step 1844 to track the request. Some embodiments may alternatively include optional step 1824 where an attempt to locate the requested content from one or more remote sources 120, 214, and to provide to the user and/or playback device with an identification, network address and/or access to the remote source when available. The process 1810 can then continue to step 1844 to track the request.

In step 1830 the virtual storage 112 is evaluated to determine whether the requested content is stored on the virtual storage 112. When the requested content is not available through the virtual storage 112, step 1832 is entered and a notification is generated and forwarded to the playback device. Again, the process 1810 may then continue to step 1844 to track the request.

In step 1834, the virtual storage 112 is evaluated to determine whether the requested content can be provided to the playback device. In some instances, the requested content may have some restrictions. For example, the content may be limited to a specific portable storage medium 116 or not associated with the portable storage medium being accessed by the playback device, may be restricted to a specific certificate, an authorization may be needed, a user's account may not be at a sufficient level to allow the content to be delivered, the content may not be able to be played back through the playback device requesting the content (e.g., the requested content is formatted and/or encoded for a portable storage device with a small screen and the playback device is a high definition playback device, the content is formatted and encoded for a high definition playback device and the device requesting the content is a small portable playback device, and/or other such factors), the user and/or user account associated with the request may not have authorization to access the content (e.g., the requesting user may be a child and the content may be adult content), and other such factors or a combination of such factors. When the requested content cannot be provided the process continues to step 1832 where notification is generated and forwarded to the playback device 114. This notification may include a reason why and possibly ways to overcome the restrictions (e.g., paying for content; upgrading membership/account; providing access to a remote source 120 where authorization may be obtained and other such information).

In step 1836, it is determined whether to immediately supply the requested content. This determination can be based on one or more factors, such as but not limited to, a priority of content to be played back in association with the portable storage medium 116 being accessed by the playback device 114, an amount of freed up local memory 326 on the playback device 114, whether the request content is to be streamed, progressively downloaded, fully downloaded or otherwise provided to the playback device, playback timing in accordance with a playlist at the playback device, other such factors or combinations of such factors. In some implementations the remote source has access to the playlist and/or index table intended to be implemented in accordance with the portable storage medium 116 being accessed at the playback device 114. For example, the playback device 114 may supply the playlist, the remote source may have an updated playlist and/or index table to be utilized by the playback device and the like. As another example, the remote source 120 may already have stored locally a playlist and/or an updated playlist to be implemented in cooperation with the portable storage medium, the remote source may access a separate remote source to acquire the playlist or an updated playlist, or the remote source may acquire the playlist from another source. When the content is not to be immediately transmitted the process returns to step 1836 to wait until transmission it to occur.

In step 1840 the requested content is transferred. This transfer can include identifying which version of the requested content should be transferred, when multiple versions are available, based on one or more factors, such as the capabilities of the playback device (e.g., whether the playback device is capable of playing back high definition content, decoding and/or buffer capabilities of the playback device, display capabilities of the playback device, and other such factors), communication link bandwidth an other such factors. It is noted that some embodiments may continue to monitor one or more factors while the content is transferred to the playback device, and may potentially switch to a different version of the content during the transfer of the content, for example due to changes in the communication bandwidth that might result in delays at the playback device, due to buffer fill levels and/or other such factors or combinations of such factors.

In step 1842, the requested content is deleted from virtual storage when appropriate. In some embodiments, the virtual storage is not intended as a back-up storage. As such, the requested content may be deleted from the virtual storage once forwarded to the playback device 114. In some embodiments, however, where the content is relatively large and it is anticipated that the playback device 114 will be unable to locally store all of the requested content, the virtual storage 112 may retail the content with the anticipation that the playback device 114 will delete the content from local storage 326 as it is played back. Similarly, in some instances, the virtual storage may be accessed by one or more other playback devices 114 associated with the same virtual storage 112. As such, a copy of the transferred content may be maintained on the virtual storage, assuming rights to the content allow such duplicate copies, to be utilized by another playback device. Additionally, the virtual storage may utilize the memory from multiple playback devices 114, 216, 220, 221, and as such the content may be maintained at the original playback device (when licensing or other authorization allows) after a copy is transferred to the requesting playback device. Further, in some implementations, the content of a specific virtual storage 112 (i.e., a virtual storage associated with a user or playback device) is part of a large database of content associated with numerous unrelated users and/or playback devices. As such, a single copy of content on the virtual storage may be associated with any number of different users and/or different playback devices, with the virtual storage 112 associated with a user and/or playback device comprising a listing of those contents within the database that are associated with the user or playback device. In these instances the transfer of the content would not result in the deletion of the content from the virtual storage database, or would not result in the deletion unless the requesting user or playback device is the only user or playback device associated with the requested content.

In step 1844, the transfer of the content is tracked or otherwise logged. This tracking can include storing an identification of the content transferred, the playback device and/or user requesting the content, the number of times the content has been transferred, an identification of the portable storage medium 116 with which the content is intended to be played back in association with at the playback device, time, date, other data or combinations of such data. Similarly, the tracking can store information about the deletion of the content from the virtual storage 112 when such content is deleted in step 1842.

Figure 19:
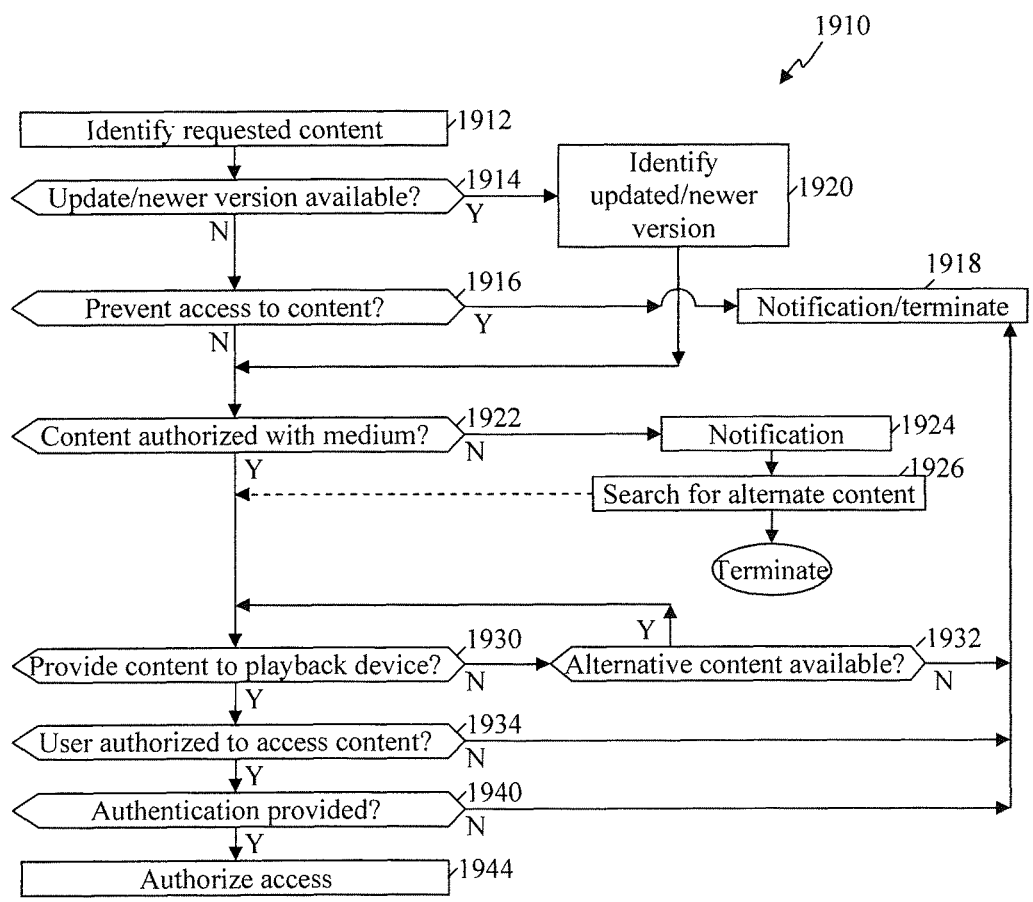
FIG. 19 depicts a simplified flow diagram of a process for use in identifying content to be supplied to a playback device in response to a request for content from a virtual storage.

FIG. 19 depicts a simplified flow diagram of a process 1910 for use in identifying content to be supplied to a playback device 114 in response to a request for content from the virtual storage 112. In some embodiments, the process 1910 can be utilized to implement some or all of step 1826 and/or 1830 of the process 1810 of FIG. 18 in identifying content from the virtual storage and determining whether the content is accessible to the requesting playback device and/or user. In step 1912, the requested content is identified. In step 1914, it is determined whether there is a newer version of the requested content and/or whether there are instructions to provide one or more different override contents in place of the requested content. Again, in some implementations the requested content may become stale or no longer relevant. As such, updated or different content may be identified, for example by a content owner (e.g., a movie studio), that is to be supplied in place of one or more contents that may be stored through the virtual storage 112. This allows for the updating of content requested by a portable storage medium 116 or to be played back in association with a portable storage medium, to provide more current and/or more relevant content, to replace content that has an error or becomes obsolete, and the like. When there is an indication that updated or different content is associated with the requested content the process advances to step 1920.

Alternatively, step 1916 is entered to determine whether instructions are present that simply prevent access to the requested content. For example, the content may have expired without updated content being available; the virtual storage 112 or the server 120 implementing and/or managing the virtual storage 112 may receive a notification that an identified content should not be distributed; a content owner may identify that content in the virtual storage 112 is no longer relevant; a notification can be received that content is expired; or other such information. When it is determined that access to the content should be prevented step 1918 is entered where a notification may optionally be issued and the process terminates, and in some instances returns to step 1844 to track the request and override when relevant. Alternatively, there is no indication that the content is prevented from being forwarded the process continues to step 1922.

In step 1920, the one or more updated, newer version or different content are identified based on the requested content. In step 1922, the one or more content identified to be forwarded in response to the request are evaluated to determine whether the content is authorized to be associated with the identified portable storage medium 116. Again, the portable storage medium 116 may define limitations regarding what content may be played back in association with the portable storage medium, the content attempting to be accessed may also define limitations or other such issues or combinations of such issues.

When the identified content is authorized to be utilized in association with the portable storage medium 116 the process continues to step 1930. Alternatively, when the identified content is not authorized to be utilized in association with the portable storage medium 116 being accessed by the requesting playback device the process advances to step 1924 where a notification may optionally be issued. In some embodiments, the process 1910 may optionally advance to step 1926 where a search may be initiated for alternate content that may be provided in place of the identified content. This search may include initiating an inquiry to a content owner (e.g., a movie studio) for alternative content, determining whether and/or seeking authorization to provide an older version of the requested content, or other such actions. When alternate content can be identified the process may continue to step 1930. Alternatively, when replacement content cannot be identified the process 1910 terminates.

In step 1930, it is determined whether the identified content can be provided to the identified playback device (e.g., whether there is some restrictions associated with the playback device or the type of playback device; whether the playback device is capable of receiving and playing back the identified one or more contents; and other such factors). Additionally, in some implementations, an evaluation of the communication bandwidth may be evaluated at least in association with the playback device and the playback device's capabilities to receive the content and the potential delays that may result from the communication of the identified content. When it is determined that the content cannot be provided some embodiment may continue to optional step 1932 to determine whether an alternative content or version of the content is available (e.g., whether a lower quality version of the content can be provided). The process can return to step 1930 to verify that the replacement content can be forwarded to the playback device 114. Alternatively, the process may return to step 1918 to issue a notification.

In step 1934, it is determined whether a user, user account and/or user profile authorize access to the identified content. For example, an evaluation can be implemented to determine whether a user account is current (e.g., paid up to date); does a user account level authorize retrieval of the identified content; has user reached a limit of content retrieved relative to a user's account level; whether a user is authorized or user profile authorizes access to the identified content (e.g., determining whether the content is age appropriate for the identified user); and/or other such evaluations. When the user is not authorized the process returns to step 1918.

When a user is authorized the process continues to step 1940 to determine whether authentication and/or other authorization is needed and been provided. Again, some content may require an authentication, such as a password, a confirmation of payment or other such authentication before access is granted. In those instances where an authentication is needed and not provided the process returns to step 1918. Alternatively, the process continues to step 1944 where access is authorized.

As described above, the portable storage medium 116, in some embodiments, provides the functionality to allow the playback device 114 to utilize the virtual storage 112. In some instances, the portable storage medium provides software, programming and/or application program interfaces (API) that can be implemented by the playback device 114. Similarly, the remote source 120, 214 can implement software, programming and/or APIs to manage content on the virtual storage 112, store content from the playback device 114 and/or provide content from the virtual storage 112. Below are some example APIs that may be utilized in some embodiments to request content from the virtual storage 112 and/or deliver content from the virtual storage.

UserContentProvider_GetDataContent_Request:

```
<?xml version="1.0" encoding="UTF-8"?>
<api type="FeatureData" typeId="50" messageType="Request">
    <feature type="UserContentProvider" typeId="21"
    action="GetDataContent">
        <content id="[String]"/>
    </feature>
</api>
<!--
```

This API can be used to retrieve specific content for a user. The Headers include:

"Disc-ID"—provides an identification (ID) of a portable storage medium 116 (e.g., an optical disc) for which content from the virtual storage 112 should be returned.

"Organization-Id"—can provide a value indicating which specific portable storage medium is associated with the request and a source or owner of the content on the portable storage medium (e.g., identifies what movie studio the portable storage medium may have come from).

"Current-User-Id"—provides a value identifying a playback device 114 and/or user making the request.

The parameters in the API request further include:

content\@id—provides an identifier value indicating what content should be brought down for the disc and user.

UserContentProvider_GetDataContent_Response:

```
<?xml version="1.0" encoding="UTF-8"?>
<api type="FeatureData" typeId="50" messageType="Response">
    <statusCodes>
        <statusCode id="[Int32]"
    type="[Severe/Critical/Warning/Information]">[Description]</statusCode>
    </statusCodes>
    <feature type="UserContentProvider" typeId="21" action="GetDataContent">
        <content id="[String]">
            <data index="[Int16]">[String]</data>
            <data index="[Int16]">[String]</data>
            <data index="[Int16]">[String]</data>
        </content>
    </feature>
</api>
<!--
```

This API can be used to retrieve specific content from the virtual storage 112, such as images, data text or the like, response to the above request in obtaining requested content. The Parameters include:

- statusCode—provides data associated with the response of the xml request. If an error is detected an explanation of the error can be provided.
- statusCode\@id—provides a value indicating the status of the response. For example, the statusCode\@id can include: 0100—Success; 0004—Database Failure; and 4150—Content Id Not Available.
- statusCode\@type—provides a type value on the response ID categorizing it into, for example, four (4) different categories:
  ValuesTypes: Severe, Critical, Warning, Information
- content\@id—provides an identifier value indicating what content should be brought down for the disc.
- data\@index—provides the index of the data being provided for the particular content ID.
- data—provides the data of the user content being provided.

UserContentProvider_GetImageContent_Request:

```
<?xml version="1.0" encoding="UTF-8"?>
<api type="FeatureData" typeId="50" messageType="Request">
    <feature type="UserContentProvider" typeId="21"
        action="GetImageContent">
            <content id="[String]"/>
    </feature>
</api>
<!--
```

This API can be used to retrieve specific content for a user. The Parameters include:
This API can be used to retrieve specific content for a user. The Headers include:

- "Disc-ID"—provides an identification (ID) of a portable storage medium 116 (e.g., an optical disc) for which content from the virtual storage 112 should be returned.
- "Organization-Id"—can provide a value indicating which specific portable storage medium is associated with the request and a source or owner of the content on the portable storage medium (e.g., identifies what movie studio the portable storage medium may have come from).
- "Current-User-Id"—provides a value identifying a playback device 114 and/or user making the request.

The parameters in the API request further include:
- content\@id—provides an identifier value indicating what content should be brought down for the disc and user.

UserContentProvider_GetImageContent_Response:

```
<?xml version="1.0" encoding="UTF-8"?>
<api type="FeatureData" typeId="50" messageType="Response">
    <statusCodes>
        <statusCode id="[Int32]"
    type="[Severe/Critical/Warning/Information]">[Description]</statusCode>
    </statusCodes>
    <feature type="UserContentProvider" typeId="21" action="GetContent">
        <content id="[String]">
            <image uri="" />
            <image
    uri="http://www.discupdate.com/ContentServer/Studio/Disc/1/sample1.png"
    />
            <image uri="" />
            <image uri="" />
            <image
    uri="http://www.discupdate.com/ContentServer/Studio/Disc/1/sample2.png"
    />
        </content>
    </feature>
</api>
<!--
```

This API can be used to retrieve specific content from the server such as images or text. The Parameters include:

- statusCode—provides data associated with the response of, for example, the xml request. If an error is detected an explanation of the error can be provided.
- statusCode\@id—provides a value indicating the status of the response. For example, the statusCode\@id can include: 0100—Success; 0004—Database Failure; 4150—Content Id Not Available.
- statusCode\@type—provides a type value on the response ID categorizing it into, for example, four (4) different categories:
  ValuesTypes: Severe, Critical, Warning, Information
- content\@id—provides an identifier value indicating what content should be brought down for the disc.
- image\@uri—provides a URI from which the image may be downloaded.

UserContentProvider_SetDataContent_Request:

```
<?xml version="1.0" encoding="UTF-8"?>
<api type="FeatureData" typeId="50" messageType="Request">
    <feature type="UserContentProvider" typeId="21"
    action="SetDataContent">
        <content id="[String]">
            <data index="[Int16]">[String]</data>
            <data index="[Int16]">[String]</data>
            <data index="[Int16]">[String]</data>
        </content>
    </feature>
</api>
<!--
```

This API can be used to set specific content for a playback device and/or user. The Headers include:

- "Disc-ID"—provides an identification of a portable storage medium 116 for which content should be returned.
- "Organization-Id"—can provide a value indicating which specific portable storage medium is associated with the request and a source or owner of the content on the portable storage medium (e.g., identifies what movie studio the portable storage medium may have come from).
- "Current-User-Id"—provides a value identifying a playback device 114 and/or user making the request.

The parameters in the API request further include:

- content\@id—provides an identifier value indicating what content should be brought down for the disc and user.
- content\data\@index—identifies an index of the data being set.
- content\data—identifies data to set for the particular content desired and index value defined.

UserContentProvider_SetDataContent_Response:

```
<?xml version="1.0" encoding="UTF-8"?>
<api type="FeatureData" typeId="50" messageType="Response">
    <statusCodes>
        <statusCode id="[Int32]"
    type="[Severe/Critical/Warning/Information]">[Description]</statusCode>
    </statusCodes>
    <feature type="UserContentProvider" typeId="21" action="SetDataContent">
    </feature>
</api>
<!--
```

This API can be used to set specific content from the virtual storage 112 such as images or text. The Parameters include:

- statusCode—provides data associated with the response of the xml request. If an error is detected an explanation of the error can be provided.
- statusCode\@id—provides a value indicating the status of the response. For example, the statusCode\@id can include: 0100—Success; 0004—Database Failure; 4150—Content Id Not Available; 4152—Content out of Bounds (This occurs when an index provider goes beyond the boundary limit).
- statusCode\@type—provides a type value on the response ID categorizing it into, for example, four (4) different categories:
  ValuesTypes: Severe, Critical, Warning, Information UserContentProvider_SetImageContent_Request:

```
<?xml version="1.0" encoding="UTF-8"?>
<api type="FeatureData" typeId="50" messageType="Request">
    <feature type="UserContentProvider" typeId="21"
    action="SetImageContent">
        <content id="[String]">
            <image uri="[String]" index="[Int16]" />
        </content>
    </feature>
</api>
<!--
```

This API can be used to set specific content for a playback device and/or user. The Headers include:

- "Disc-ID"—provides an identification (ID) of a portable storage medium 116 (e.g., an optical disc) for which content from the virtual storage 112 should be returned.
- "Organization-Id"—can provide a value indicating which specific portable storage medium is associated with the request and a source or owner of the content on the portable storage medium (e.g., identifies what movie studio the portable storage medium may have come from).
- "Current-User-Id"—provides a value identifying a playback device 114 and/or user making the request.

The parameters in the API request further include:

- content\@id—provides an identifier value indicating what content should be brought down for the portable storage medium and/or user.
- content\image\@uri—represents the URI of the image that is being set for the user's content.

content\image\index—represents the index number of the image. This may be used for sorting or if storing information in a specific block.

UserContentProvider_SetImageContent_Response:

```
<?xml version="1.0" encoding="UTF-8"?>
<api type="FeatureData" typeId="50" messageType="Response">
    <statusCodes>
        <statusCode id="[Int32]"
        type="[Severe/Critical/Warning/Information]">[Description]</statusCode>
    </statusCodes>
    <feature type="UserContentProvider" typeId="21"
    action="SetImageContent">
    </feature>
</api>
<!--
```

This API can be used to set specific content from the server such as images or text. The Parameters include:

- statusCode—provides data associated with the response of an xml request. If an error is detected an explanation of the error can be provided.
- statusCode\@id—provides a value indicating the status of the response. For example, the statusCode\@id can include: 0100—Success; 0004—Database Failure; 4150—Content Id Not Available; 4152—Content out of Bounds (This occurs when an index provider goes beyond the boundary limit).
- statusCode\@type—provides a type value on the response ID categorizing it into, for example, four (4) different categories:
    ValuesTypes: Severe, Critical, Warning, Information Several embodiments of the invention advantageously address the needs above as well as other needs by providing methods of managing content in providing a playback experience associated with a portable storage medium. These embodiments detect, at a multimedia playback device, access to a first portable storage medium with multimedia content recorded on the first portable storage medium; evaluate content on the first portable storage medium, in response to detecting access to the first portable storage medium; evaluate local memory of the multimedia playback device; determine, in response to the evaluation of the content on the first portable storage medium and the evaluation of the local memory, whether memory on the local memory needs to be freed up in implementing playback of multimedia content in association with the first portable storage medium; and move one or more contents stored on the local memory of the multimedia playback device to a virtual storage accessible by the multimedia playback device over a distributed network in response to determining that memory on the local memory needs to be freed up.

Some embodiment can be characterized as methods of managing content in providing a playback experience in associated with a portable storage medium. These methods detect, a multimedia playback device, access to a portable storage medium with multimedia recorded on the portable storage medium; access and implementing, at the multimedia playback device, an application recorded on the portable storage medium such that the multimedia playback device is, in response to implementing the application, adapted to: evaluate content on the portable storage medium, in response to detecting access to the portable storage medium; evaluate local memory of the multimedia playback device; determine, in response to the evaluation of the content on the portable storage medium and the evaluation of the local memory, whether memory on the local memory needs to be freed up in providing play back of multimedia content in association with the portable storage medium; and move one or more contents stored on the local memory of the multimedia playback device to a virtual storage accessible by the multimedia playback device over a distributed network freeing up a first portion of the local memory in response to determining that memory on the local memory needs to be freed up.

Other embodiments provide multimedia playback devices. At least some of these embodiments comprise: a portable storage medium drive adapted to receive and read content from a portable storage medium, where multimedia content and a virtual storage application are recorded on the portable storage medium; local memory; and a processor communicationally coupled with the portable storage medium drive to implement the virtual storage application such that the processor, in implementing the virtual storage application, is adapted to: evaluate content on the portable storage medium; evaluate the local memory in determining an amount of available memory of the local memory; determine, in response to the evaluation of the content on the portable storage medium and the evaluation of the local memory, whether memory on the local memory needs to be freed up in providing play back of multimedia content in association with the portable storage medium; and move one or more contents stored on the local memory of the multimedia playback device to a virtual storage accessible by the multimedia playback device over a distributed network in response to determining that memory on the local memory needs to be freed up.

Further embodiments provide methods of managing content to be played back at a playback device in association with a portable processor readable storage medium. These methods receive a request, from a remote playback device and over a distributed network, to move a first content currently stored in local storage of the remote playback device; identify the playback device from which the request is received; determine whether virtual storage is associated with the identified playback device; store the first content to a virtual storage in response to determining that the virtual storage is associated with the identified playback device; and associate the first content with the identified playback device.

Some embodiments provide methods of managing content to be played back at a playback device in association with a portable processor readable storage medium. These methods receive a request, from a remote playback device and over a distributed network, to move a first content currently stored in local storage of the remote playback device; identify a virtual storage associated with the request; determine whether a second content is to be stored in the virtual storage in place of the first content; store the second content to the virtual storage in response to determining that the second content is to be stored in the virtual storage in place of the first content; and associate the second content with the identified playback device and the first content such that subsequent requests to retrieve the first content are directed at the second content instead of the first content.

Further embodiments provide methods of managing content. Some of these methods receive a request, from a remote playback device and over a distributed network, to retrieve a first content to be played back at the playback device in cooperation with a processor readable portable storage medium directly accessed by the playback device; identify a virtual storage associated with the request; determine whether the first content is stored within the identified virtual storage; determine whether a second content is to be provided in place of the first content; and supply the second content to the playback device in response to determining that second content is to be provided in place of the first content.

Additionally, some embodiments provide methods of managing content. These methods can comprise: receiving a request, from a remote playback device and over a distributed network, to retrieve a first content from a virtual storage to be played back at the playback device in cooperation with a processor readable portable storage medium actively being directly accessed by the playback device at the time the request is received; identifying a virtual storage associated with the request; determining whether the first content is stored within the identified virtual storage; determining whether a second content is to be provided in place of the first content; supplying the second content to the playback device in response to determining that second content is to be provided in place of the first content.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of managing content in providing a playback experience associated with a portable storage medium, the method comprising:
    detecting, at a multimedia playback device, access to a first portable storage medium with multimedia content recorded on the first portable storage medium;
    evaluating content on the first portable storage medium;
    evaluating local memory of the multimedia playback device based on the access to the first portable storage medium; and
    moving one or more contents stored on the local memory of the multimedia playback device to a virtual storage accessible by the multimedia playback device over a distributed network in response to determining based on the evaluation of the content on the first portable storage medium and the evaluation of the local memory that memory on the local memory needs to be freed up in implementing playback of content.

2. The method of claim 1, further comprising:
    determining whether a first content, which is different than the one or more contents moved to the virtual storage, is to be acquired from the virtual storage;
    acquiring the first content from the virtual storage;
    locally storing the first content at the multimedia playback device in freed up local memory on the multimedia playback device that was freed up as a result of the moving of the one or more contents to the virtual storage; and
    playing back at least a portion of the first content in cooperation with the first portable storage medium.

3. The method of claim 2, further comprising:
    logging the moving of the one or more contents to the virtual storage; and
    logging the locally storing the first content to the local memory of the multimedia playback device from the virtual storage.

4. The method of claim 1, further comprising:
    obtaining, at the multimedia playback device, a first updated Binding Unit Manifest File (BUMF); and
    initiating playback, at the multimedia playback device, of content in association with the first portable storage medium and in accordance with the first updated BUMF.

5. The method of claim 4, further comprising obtaining an updated Binding Unit Signature File (BUS) corresponding to the first updated BUMF file.

6. The method of claim 1, further comprising:
    retrieving from the virtual storage, in response to the multimedia playback device accessing a second portable storage medium with further multimedia recorded on the second portable storage medium, at least a first content of the one or more contents moved to and stored on the virtual storage; and
    initiating playback at the multimedia playback device of the first content in cooperation with playback in accordance with the second portable storage medium.

7. The method of claim 1, further comprising:
    identifying that additional content is to be acquired from a remote source and stored locally on the multimedia playback device to be played back in association with the first portable storage medium;
    determining that the memory on the local memory needs to be freed up based on the identifying that the additional content is to be acquired;
    obtaining the additional content to be played back in association with the first portable storage medium;
    recording the additional content to at least a portion of the freed up local memory; and
    obtaining, at the multimedia playback device, a first updated Binding Unit Manifest File (BUMF) corresponding at least to the additional content.

8. The method of claim 1, further comprising:
    acquiring a first portion of a first content associated with the first portable storage medium;
    locally storing the first portion of the first content at the multimedia playback device in at least a portion of the freed up local memory that was freed up as a result of the moving of the one or more contents to the virtual storage;
    playing back at least the first portion of the first content during a playback experience in cooperation with the first portable storage medium;
    moving the first portion of the first content, during the playback experience, from the local memory to the virtual storage to free up a second portion of the local memory;
    acquiring a second portion of the first content during the playback experience;
    locally storing the second portion of the first content to the freed up second portion of the local memory; and
    playing back the second portion of the first content during the playback experience in cooperation with the first portable storage medium.

9. The method of claim 1, further comprising:
    identifying one or more content stored on the local memory of the playback device to potentially move to the virtual storage in response to determining that memory on the local memory needs to be freed up;
retrieving one or more certificates from the first portable storage medium; and
evaluating content stored on the local memory to identify the one or more content to potentially move to the virtual storage where each of the one or more content to potentially move to the virtual storage corresponds with at least one of the one or more certificates.

10. A method of managing content to be played back at a playback device in association with a portable processor readable storage medium, the method comprising
receiving at a server a request, over a distributed network from a remote playback device based on the remote playback device evaluating local memory of the remote playback device in response to the remote playback device locally accessing a portable storage medium, to move a first content currently stored in the local memory of the remote playback device;
identifying the remote playback device from which the request is received;
determining whether virtual storage is associated with the identified remote playback device;
causing the first content, from the remote playback device and obtained from the local memory of the remote playback device in freeing up memory of the local memory of the remote playback device in response to the evaluation of the local memory of the remote playback device, to be stored to a virtual storage; and
associating the first content stored in the virtual storage with the identified remote playback device by
obtaining, from the remote playback device, a certificate recorded on the portable storage medium; and
associating the certificate with an identification of the first content stored in the virtual storage.

11. The method of claim 10, wherein the associating the first content stored in the virtual storage with the identified remote playback device further comprises updating a virtual storage table to include an identification of the first content stored in the virtual storage, an identification of the remote playback device, and an association between the identification of the first content stored in the virtual storage and the identification of the remote playback device.

12. The method of claim 10, further comprising:
determining a data size of the first content;
determining whether storing the first content would exceed a virtual storage limit of the virtual storage associated with the identified remote playback device;
causing other content to be removed from the virtual storage when the virtual storage limit would be exceeded; and
allowing storage of the first content to the virtual storage in response to the removing the other content.

13. A method of managing content to be played back at a playback device in association with a portable processor readable storage medium, the method comprising:
receiving at a server a request, over a distributed network from a remote playback device based on the remote playback device evaluating local memory of the remote playback device in response to the remote playback device locally accessing a portable storage medium, to move a first content currently stored in the local memory of the remote playback device;
identifying the remote playback device from which the request is received;
determining whether virtual storage is associated with the identified remote playback device;
causing the first content, from the remote playback device and obtained from the local memory of the remote playback device in freeing up memory of the local memory of the remote playback device in response to the evaluation of the local memory of the remote playback device, to be stored to a virtual storage;
associating the first content stored in the virtual storage with the identified remote playback device;
obtaining, from the remote playback device, a certificate recorded on the portable storage medium being accessed by the remote playback device at the time the request to store the first content on the virtual storage is issued from the remote playback device;
identifying content stored on the virtual storage that corresponds to the certificate; and
freeing up memory space in the virtual storage by causing some or all of the content that corresponds to the certificate to be removed from the virtual storage.

14. The method of claim 10, further comprising:
determining whether a second content is to be stored in the virtual storage in place of the first content;
storing the second content to the virtual storage in response to determining that the second content is to be stored in the virtual storage in place of the first content; and
associating the second content with the identified remote playback device and the first content such that subsequent requests to retrieve the first content are directed to retrieve the second content in place of the first content.

15. The method of claim 14, wherein the determining whether a second content is to be stored in the virtual storage in place of the first content comprises
determining whether the second content is usable by the remote playback device; and
determining that the second content is to be stored in the virtual storage in place of the first content when the second content is usable by the remote playback device.

16. A method of managing content to be played back at a playback device in association with a portable processor readable storage medium, the method comprising:
receiving at a server a request, over a distributed network from a remote playback device based on the remote playback device evaluating local memory of the remote playback device in response to the remote playback device locally accessing a portable storage medium, to move a first content currently stored in the local memory of the remote playback device;
identifying the remote playback device from which the request is received;
determining whether virtual storage is associated with the identified remote playback device;
causing the first content, from the remote playback device and obtained from the local memory of the remote playback device in freeing up memory of the local memory of the remote playback device in response to the evaluation of the local memory of the remote playback device, to be stored to a virtual storage;
associating the first content stored in the virtual storage with the identified remote playback device;
determining whether a second content is to be stored in the virtual storage in place of the first content;
storing the second content to the virtual storage in response to determining that the second content is to be stored in the virtual storage in place of the first content;

associating the second content with the identified remote playback device and the first content such that subsequent requests to retrieve the first content are directed to retrieve the second content in place of the first content;

determining whether a secondary playback device, which is different than the remote playback device that is authorized to access the virtual storage associated with the remote playback device, can utilize the second content in response to determining that second content is not usable by the remote playback device;

authorizing the storing of the second content to the virtual storage in response to determining that the second content can be utilized by the secondary playback device; and associating the second content with the secondary playback device and the first content such that a subsequent request from the secondary playback device to retrieve the first content is directed to the second content instead of the first content.

17. The method of claim 13, wherein the associating the first content stored in the virtual storage with the identified remote playback device further comprises updating a virtual storage table to include an identification of the first content stored in the virtual storage, an identification of the remote playback device, and an association between the identification of the first content stored in the virtual storage and the identification of the remote playback device.

18. The method of claim 13, further comprising
determining a data size of the first content;
determining whether storing the first content would exceed a virtual storage limit of the virtual storage associated with the identified remote playback device;
causing other content to be removed from the virtual storage when the virtual storage limit would be exceeded; and
allowing storage of the first content to the virtual storage in response to the removing the other content.

19. The method of claim 13, further comprising
determining whether a second content is to be stored in the virtual storage in place of the first content;
storing the second content to the virtual storage in response to determining that the second content is to be stored in the virtual storage in place of the first content; and
associating the second content with the identified remote playback device and the first content such that subsequent requests to retrieve the first content are directed to retrieve the second content in place of the first content.

20. The method of claim 19, wherein the determining whether a second content is to be stored in the virtual storage in place of the first content comprises
determining whether the second content is usable by the remote playback device; and
determining that the second content is to be stored in the virtual storage in place of the first content when the second content is usable by the remote playback device.

21. The method of claim 16, wherein the associating the first content stored in the virtual storage with the identified remote playback device comprises updating a virtual storage table to include an identification of the first content stored in the virtual storage, an identification of the remote playback device, and an association between the identification of the first content stored in the virtual storage and the identification of the remote playback device.

22. The method of claim 16, wherein causing the first content to be stored to the virtual storage comprises
determining a data size of the first content;
determining whether storing the first content would exceed a virtual storage limit of the virtual storage associated with the identified remote playback device;
causing other content to be removed from the virtual storage when the virtual storage limit would be exceeded; and
allowing storage of the first content to the virtual storage in response to the removing the other content.

* * * * *